US012773064B2

(12) United States Patent
Mou et al.

(10) Patent No.: US 12,773,064 B2
(45) **Date of Patent: *Oct. 27, 2026**

(54) RANGE HOOD

(71) Applicant: Microjet Technology Co., Ltd., Hsinchu (TW)

(72) Inventors: Hao-Jan Mou, Hsinchu (TW); Chin-Chuan Wu, Hsinchu (TW); Chi-Feng Huang, Hsinchu (TW); Yung-Lung Han, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 283 days.

This patent is subject to a terminal disclaimer.

(21) Appl. No.: 18/589,643

(22) Filed: Feb. 28, 2024

(65) Prior Publication Data

US 2024/0344713 A1 Oct. 17, 2024

(30) Foreign Application Priority Data

Apr. 14, 2023 (TW) ................................ 112114090

(51) Int. Cl.

*A47J 36/38* (2006.01)
*B01D 46/42* (2006.01)
(Continued)

(52) U.S. Cl.

CPC ............ *A47J 36/38* (2013.01); *B01D 46/429* (2013.01); *F24C 15/2021* (2013.01);
(Continued)

(58) Field of Classification Search

None
See application file for complete search history.

(56) References Cited

U.S. PATENT DOCUMENTS

2005/0224069 A1 10/2005 Patil et al.
2022/0113034 A1* 4/2022 Moore ..................... F24F 11/64
(Continued)

FOREIGN PATENT DOCUMENTS

CN 200981898 Y 10/2007
CN 104764063 A 7/2015
(Continued)

OTHER PUBLICATIONS

CN110617524A_ENG (Espacenet machine translation of Yang) (Year: 2019).*

(Continued)

*Primary Examiner* — Gabriel E Gitman
(74) *Attorney, Agent, or Firm* — Birch, Stewart, Kolasch & Birch, LLP

(57) ABSTRACT

A range hood is disclosed and includes a main body, an air guiding fan, a filtering component, and a controller. The main body is configured to form an airflow path. The air guiding fan is disposed in the airflow path and is operated to guide an air convection with an extraction rate over 22 $m^3$/min. The filtering component is disposed in the airflow path and filters an air pollution in the air convection guided by the air guiding fan. The networking controller receives a control command through wireless communication to perform an activation operation of the air guiding fan.

19 Claims, 26 Drawing Sheets

(51) Int. Cl.

| | |
|---|---|
| ***B01D 46/44*** | (2006.01) |
| ***F24C 15/20*** | (2006.01) |
| *F24F 110/50* | (2018.01) |

(52) U.S. Cl.

CPC ........ *F24C 15/2042* (2013.01); *B01D 46/442* (2013.01); *B01D 2255/802* (2013.01); *B01D 2257/708* (2013.01); *B01D 2258/0275* (2013.01); *B01D 2259/804* (2013.01); *B01D 2279/35* (2013.01); *F24C 15/2014* (2013.01); *F24F 2110/50* (2018.01)

(56) References Cited

U.S. PATENT DOCUMENTS

| | | | | |
|---|---|---|---|---|
| 2022/0280897 | A1 | 9/2022 | Mou et al. | |
| 2022/0282873 | A1 * | 9/2022 | Frayer | B01D 46/46 |
| 2023/0235914 | A1 * | 7/2023 | Mou | F24F 11/88 454/239 |

FOREIGN PATENT DOCUMENTS

| | | | | |
|---|---|---|---|---|
| CN | 204684898 | U | 10/2015 | |
| CN | 103230167 | B | 11/2015 | |
| CN | 206656996 | U | 11/2017 | |
| CN | 107559907 | A | 1/2018 | |
| CN | 208504504 | U | 2/2019 | |
| CN | 110375363 | A | 10/2019 | |
| CN | 110617524 | A * | 12/2019 | F24C 15/2021 |
| CN | 111810999 | A * | 10/2020 | F24C 15/2021 |
| CN | 113685858 | A * | 11/2021 | F24C 15/2035 |
| CN | 115405972 | A * | 11/2022 | B03C 3/08 |
| EP | 2 151 632 | A1 | 2/2010 | |
| EP | 4 053 465 | A2 | 9/2022 | |
| JP | 2007-127399 | A | 5/2007 | |
| JP | 2017-530324 | A | 10/2017 | |
| JP | 2022-135938 | A | 9/2022 | |
| JP | 2022-144804 | A | 10/2022 | |
| JP | 2022-171551 | A | 11/2022 | |
| TW | 284283 | U | 8/1996 | |
| TW | 202235847 | A | 9/2022 | |
| TW | I796113 | B | 3/2023 | |

OTHER PUBLICATIONS

CN111810999A_ENG (Espacenet machine translation of Chen) (Year: 2020).*

CN113685858A_ENG (Espacenet machine translation of Gu) (Year: 2021).*

CN115405972A_ENG (Espacenet machine translation of Wu) (Year: 2022).*

Extended European Search Report for European Application No. 24162640.7, dated Jul. 16, 2024.

* cited by examiner

RANGE HOOD

CROSS-REFERENCE TO RELATED APPLICATION

This application claims priority to Taiwan Patent Application No. 112114090, filed on Apr. 14, 2023. The entire contents of the above-mentioned patent application are incorporated herein by reference for all purposes.

FIELD OF THE INVENTION

The present disclosure relates to a range hood, and more particularly to a range hood applied to a filtration and purification application that is capable of filtering and is connected to an indoor air pollution complete purification and prevention system, detecting and cleaning the air pollution completely.

BACKGROUND OF THE INVENTION

In recent years, people pay more and more attention to the air quality around their living environment. Particulate matter (PM), such as $PM_1$, $PM_{2.5}$ and $PM_{10}$, carbon monoxide, carbon dioxide, total volatile organic compounds (TVOC), formaldehyde and even suspended particles, aerosols, bacteria and viruses contained in the air and exposed in the environment might affect human health, and even endanger people's life.

However, it is not easy to control the indoor air quality. In addition to the air quality of the outdoor space, the air environmental conditions and pollution sources, especially the air pollution including one of bacteria, fungi and virus originated from poor air circulation in the indoor space, are the major factors that affect indoor air quality.

Therefore, there is a need of providing a purification solution to immediately purify the indoor air quality, reduce breathing of harmful gases in the indoor space, instantly monitor the indoor air quality, improve the indoor air quality, and quickly purify the indoor air.

SUMMARY OF THE INVENTION

One object of the present disclosure is to provide a range hood applied to a filtration and purification application that is capable of filtering and is connected to an indoor air pollution complete purification and prevention system, whereby detecting and cleaning the air pollution completely. With a networking controller connected to an indoor air pollution complete purification and prevention system, it allows to control an activation operation of an air guiding fan, and guide air pollution to pass through filtering component for filtering the air pollution. At the same time, it further allows to detect the indoor air pollution quality and intelligently compare the ambient air quality status, and the air guiding fan is controlled according to the air pollution quality in real time to adjust the extraction rate for filtering the air pollution. Thereby, the air pollution is detected instantly and purified instantly to clean completely in a filtration and purification treatment for the ambient air quality.

In accordance with an aspect of the present disclosure, a range hood is provided and suitable for an indoor air pollution complete purification and prevention system. The range hood includes a main body, an air guiding fan, a filtering component and a networking controller. The main body is configured to form an airflow path. The air guiding fan is disposed in the airflow path, and operated to guide an air convection with an extraction rate of over 22 $m^3$/min. The filtering component is disposed in the airflow path and filters an air pollution in the air convection guided by the air guiding fan. The networking controller receives a control command through wireless communication to perform an activation operation of the air guiding fan.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
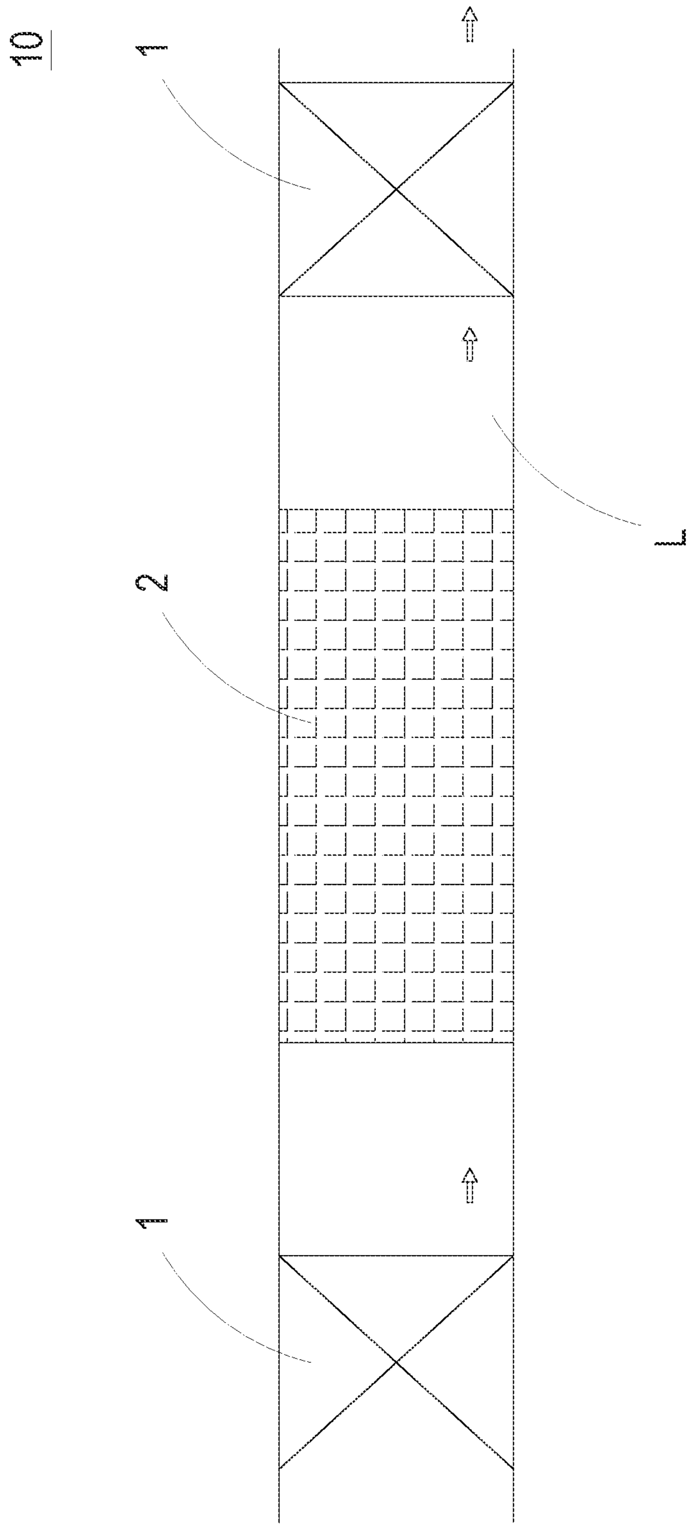
FIG. 1A is a schematic view illustrating main components of a range hood according to an embodiment of the present disclosure.
Figure 1B:
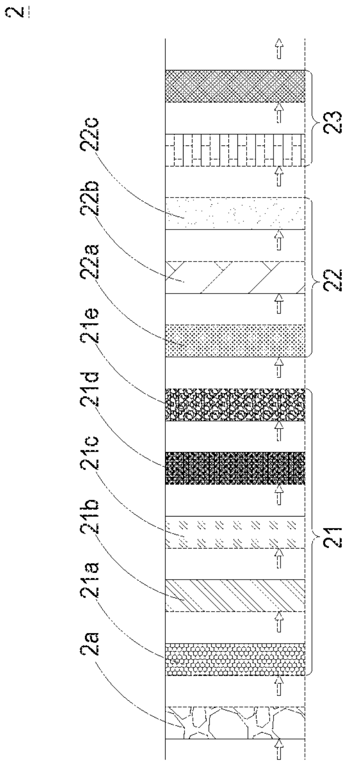
FIG. 1B is a schematic view illustrating the relevant filtering component of the range hood according to the embodiment of the present disclosure.
Figure 1C:
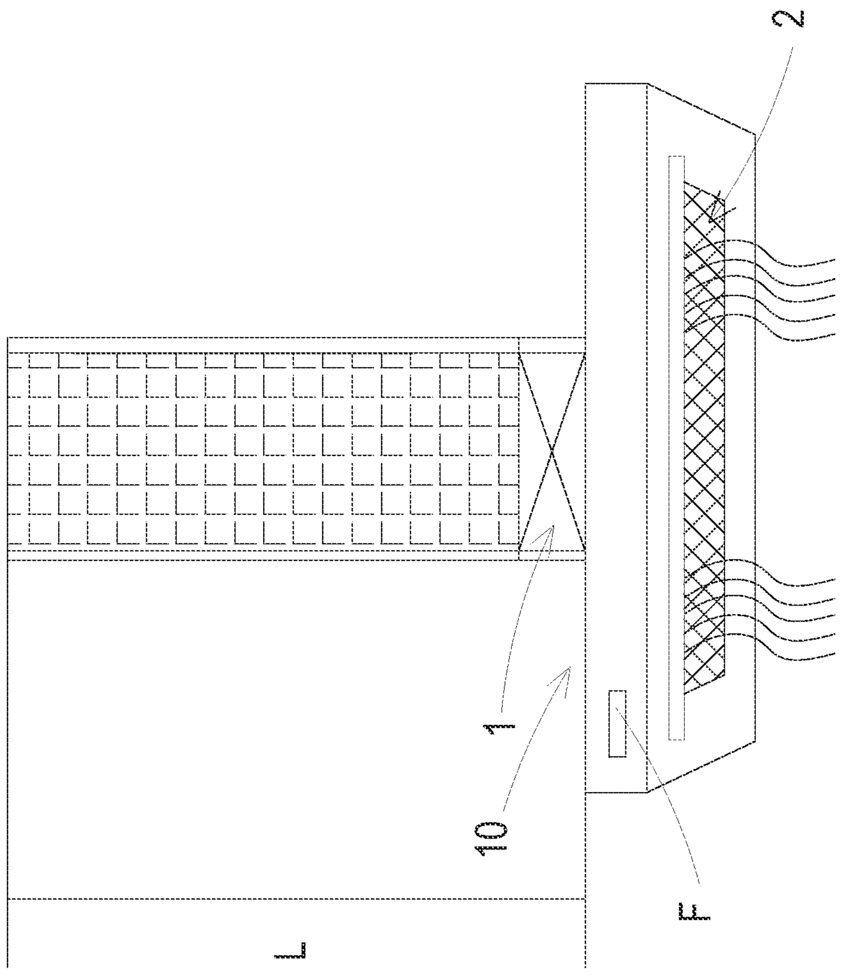
FIG. 1C is a schematic view illustrating the appearance of the range hood according to a preferred embodiment of the present disclosure.
Figure 1D:
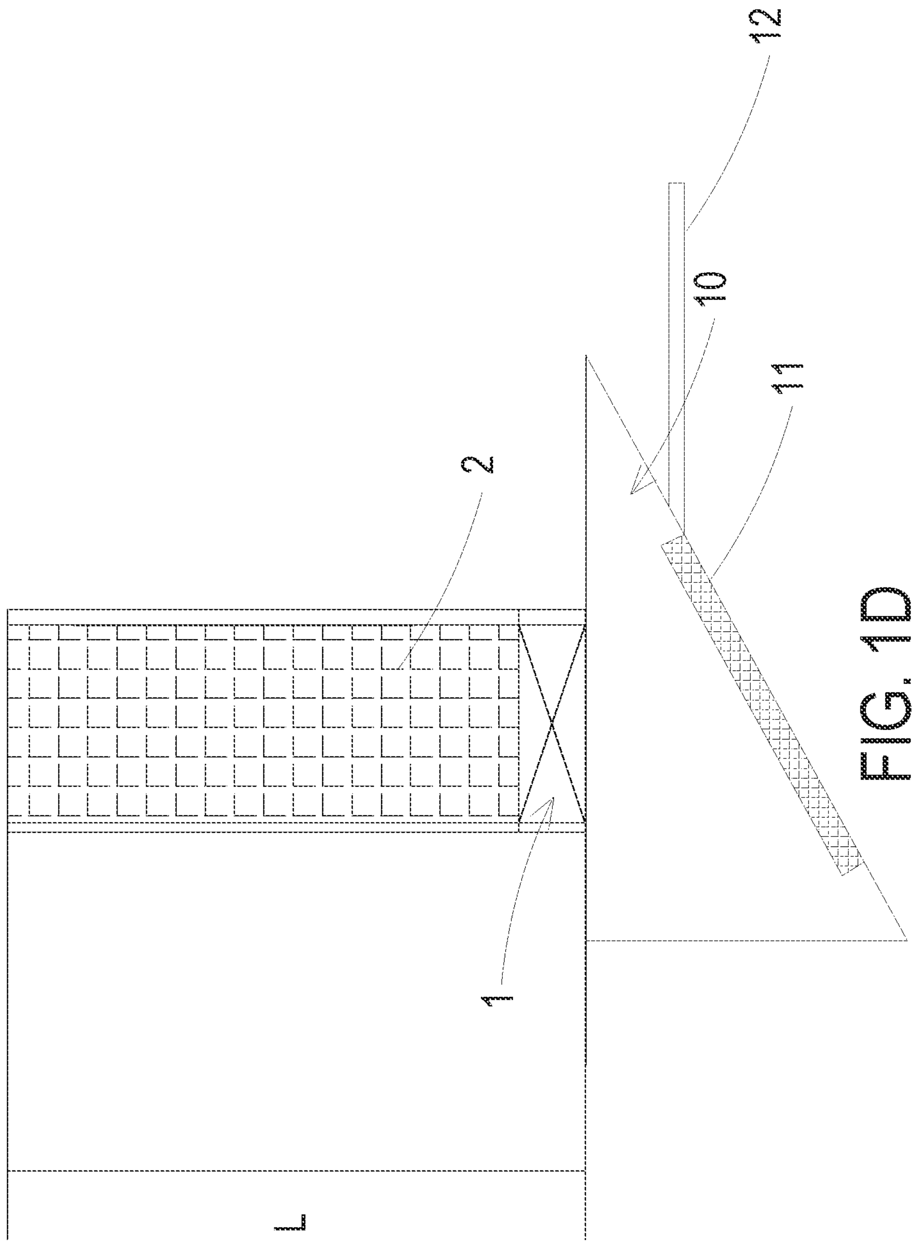
FIG. 1D is a lateral view illustrating the range hood according to the preferred embodiment of the present disclosure.

Please refer to FIG. 1A, FIG. 1B, FIG. 1C and FIG. 1D. The present disclosure provides a range hood, which is suitable for an indoor air pollution complete purification and prevention system. The range hood mainly includes a main body 10, an air guiding fan 1, a filtering component 2 and a networking controller F. In the embodiment, the main body 10 is configured to form an airflow path L. The air guiding fan 1 is disposed in the airflow path L, and operated to guide an air convection with an extraction rate over 22 $m^3$/min. The filtering component 2 is disposed in the airflow path L and filters an air pollution in the air convection guided by the air guiding fan 1. The networking controller F receives a control command through wireless communication to perform an activation operation of the air guiding fan 1. Notably, in a preferred embodiment of the present disclosure, the appearance of the range hood can be a common type as shown in FIG. 1C. Furthermore, as shown in FIG. 1D, the main body 10 includes a lateral air exhaust opening 11 in communication with the airflow path L. The main body 10 further includes a baffle 12 disposed above the lateral air exhaust opening 11. The baffle 12 allows being folded to cover the lateral air exhaust opening 11, or being extended over the lateral air exhaust opening 11 to open the lateral air exhaust opening 11 and maintain an optimized efficiency for blocking and draining in air pollution treatment. Thereby, the air is inhaled rapidly into the lateral air exhaust opening 11 by the air guiding fan 1, and flows through the filtering component 2 in the airflow path L for filtering and purifying. The air convection is directed rapidly to implement the air pollution treatment efficiency.

The above-mentioned air guiding fan 1 can be an armature-type or centrifugal-type air guiding fan, but not limited thereto. Any type of air guiding fan 1 that can generate a fluid airflow can be regarded as an extension of the embodiment of the present disclosure. In addition, from the perspective of the present disclosure, the filtering component 2 can be disposed before or after the air guiding fan 1. Preferably but not exclusively, in the embodiment of FIG. 1A, the filtering component 2 is arranged in front of the air guiding fan 1. When the airflow is introduced into the main body 10, the airflow flows through the filtering component 2 firstly for filtration and purification. Alternatively, the filtering component 2 is arranged in rear of the air guiding fan 1. After the airflow is introduced into the main body 10 by the air guiding fan 1, the air flow further flows through the filtering component 2 for filtration and purification. Both aspects belong to the scope of the present disclosure.

In addition, the range hood of the present disclosure is suitable for the indoor air pollution complete purification and prevention system. In order to quickly remove the air pollution through the filtration and exchange of the range hood, the air guiding fan 1 must be operated to guide a strong air convection with an extraction rate over 22 $m^3$/min. If air pollution detected in the indoor space exceeds a safety detection value, the air pollution is guided to pass through the filtering component 2 for quick filtration and purification within 5 minutes, so that the complete detection and clearance in real time is achieved, the cleanliness of the indoor space reaches a gas state for safe breathing, and the purpose of quickly purifying indoor air quality is achieved.

Notably, in the above embodiment, the air pollution is at least one selected from the group consisting of particulate matter, carbon monoxide, carbon dioxide, ozone, sulfur dioxide, nitrogen dioxide, lead, total volatile organic compounds (TVOC), formaldehyde, bacteria, fungi, virus and a combination thereof. Preferably but not exclusively, the wireless communication is one selected from the group consisting of a Wi-Fi communication, a Bluetooth communication, a radio frequency identification communication and a near field communication (NFC). Preferably but not exclusively, the safety detection value includes at least one selected from the group consisting of a concentration of PM2.5 which is less than 15 μg/$m^3$, a concentration of carbon dioxide which is less than 1000 ppm, a concentration of total volatile organic compounds (TVOC) which is less than 0.56 ppm, a concentration of formaldehyde (HCHO) which is less than 0.08 ppm, a colony-forming unit of bacteria which is less than 1500 CFU/$m^3$, a colony-forming unit of fungi which is less than 1000 CFU/$m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, and a concentration of lead which is less than 0.15 μg/$m^3$.

Figure 2A:
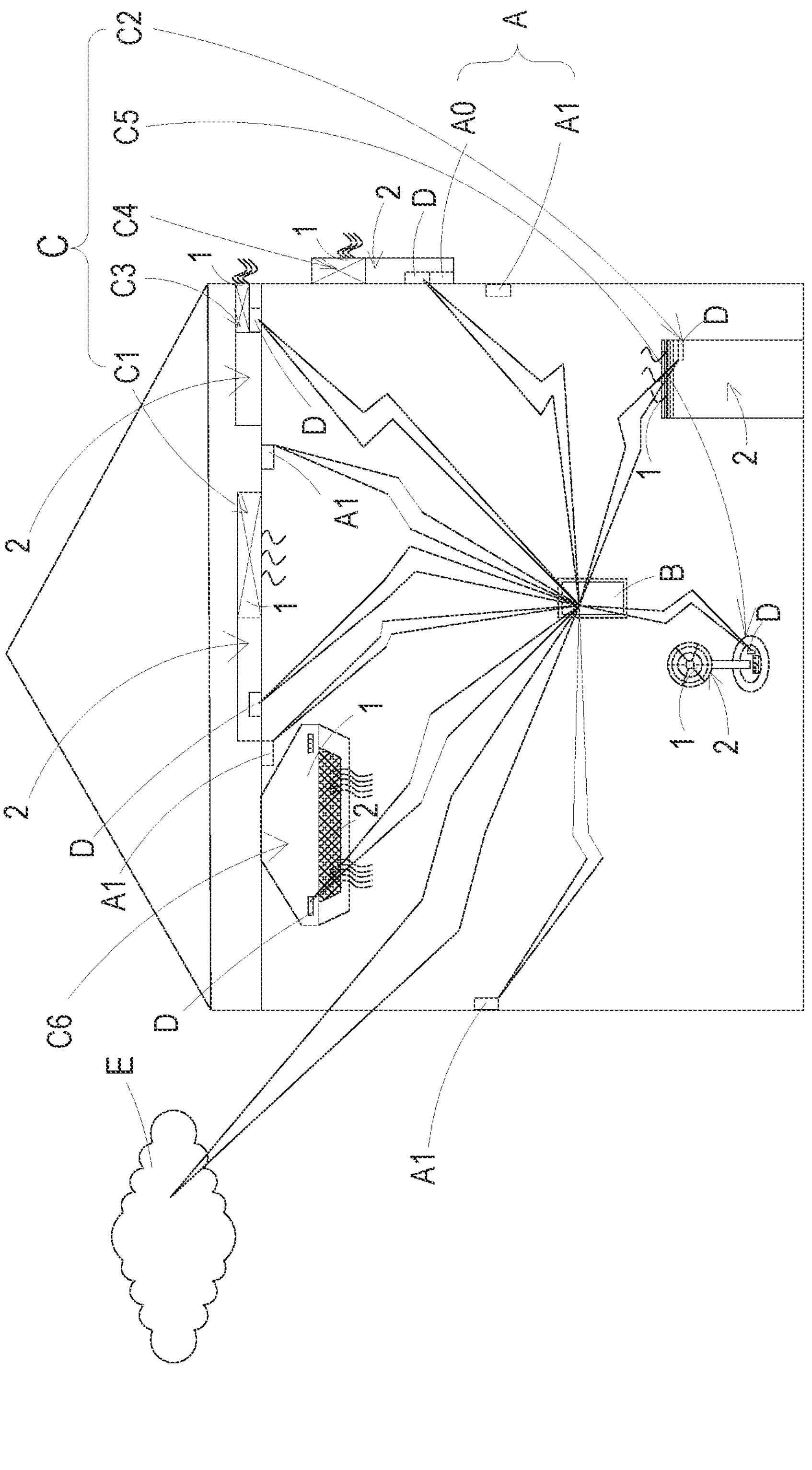
FIG. 2A is a schematic diagram illustrating the range hood of the present disclosure connected to an indoor air pollution complete purification and prevention system through a central controller in the form of an intelligent switch.
Figure 2B:
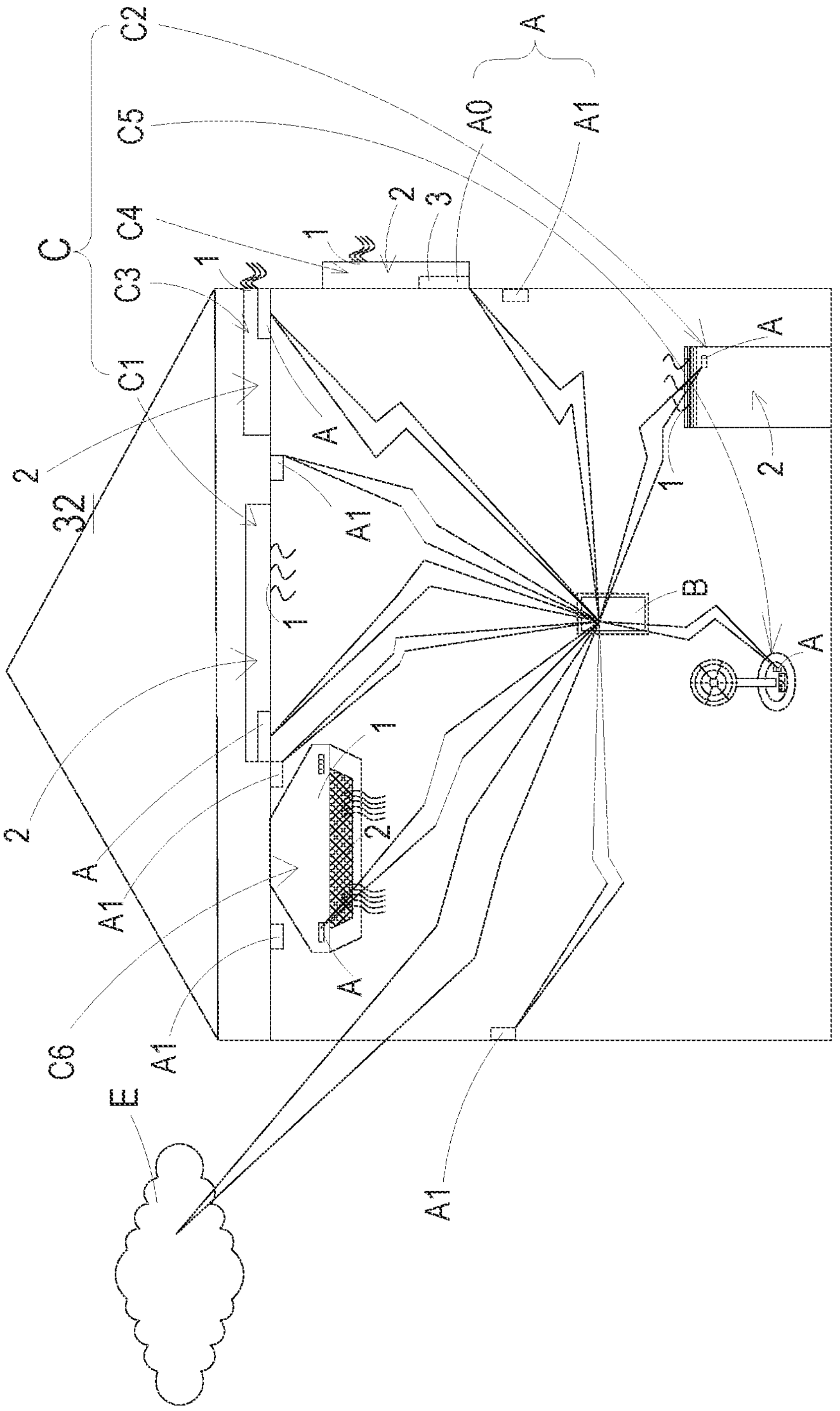
FIG. 2B is a schematic diagram illustrating the range hood of the present disclosure connected to an indoor air pollution complete purification and prevention system through a networking controller in the form of a detection microcontroller.
Figure 3A:
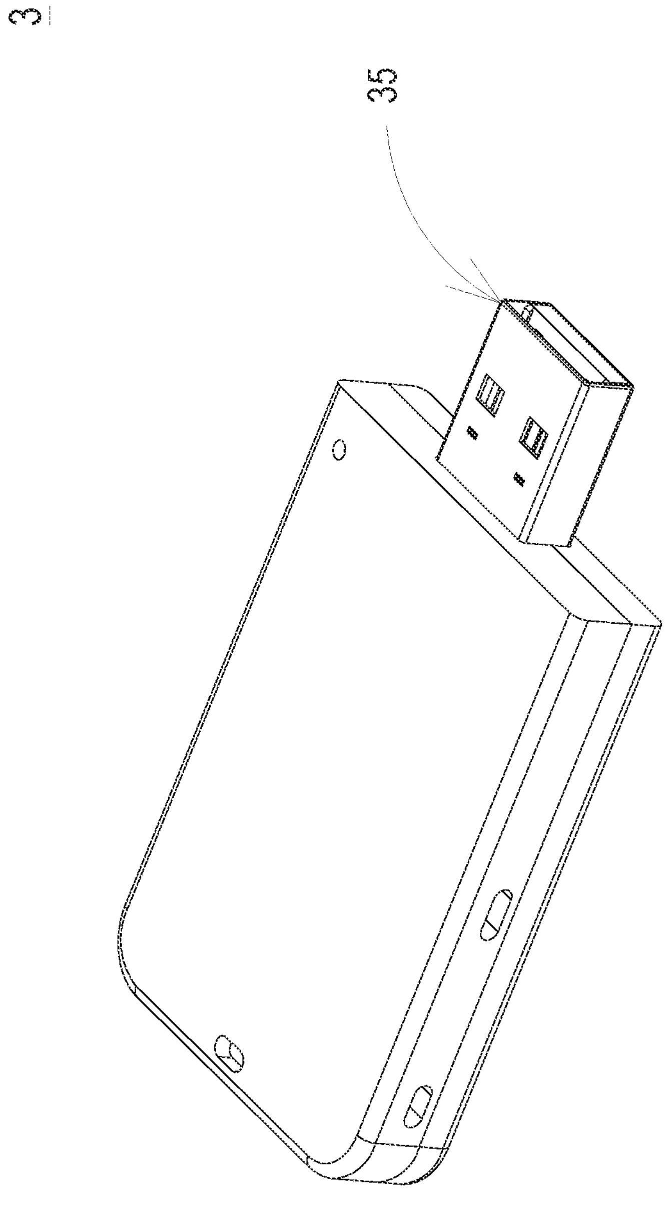
FIG. 3A is a schematic perspective view illustrating the gas detection module including an external power terminal according to the embodiment of the present disclosure.
Figure 3B:
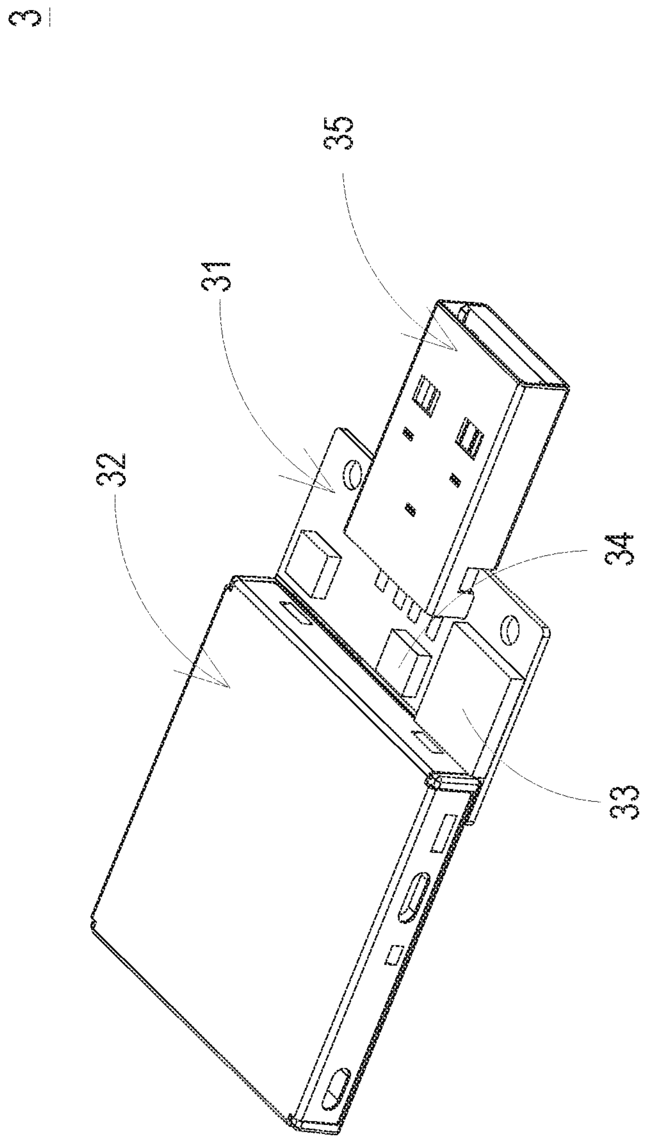
FIG. 3B is a schematic perspective view illustrating the combination relationship of relevant components of the gas detection module including the external power terminal according to the embodiment of the present disclosure.
Figure 3C:
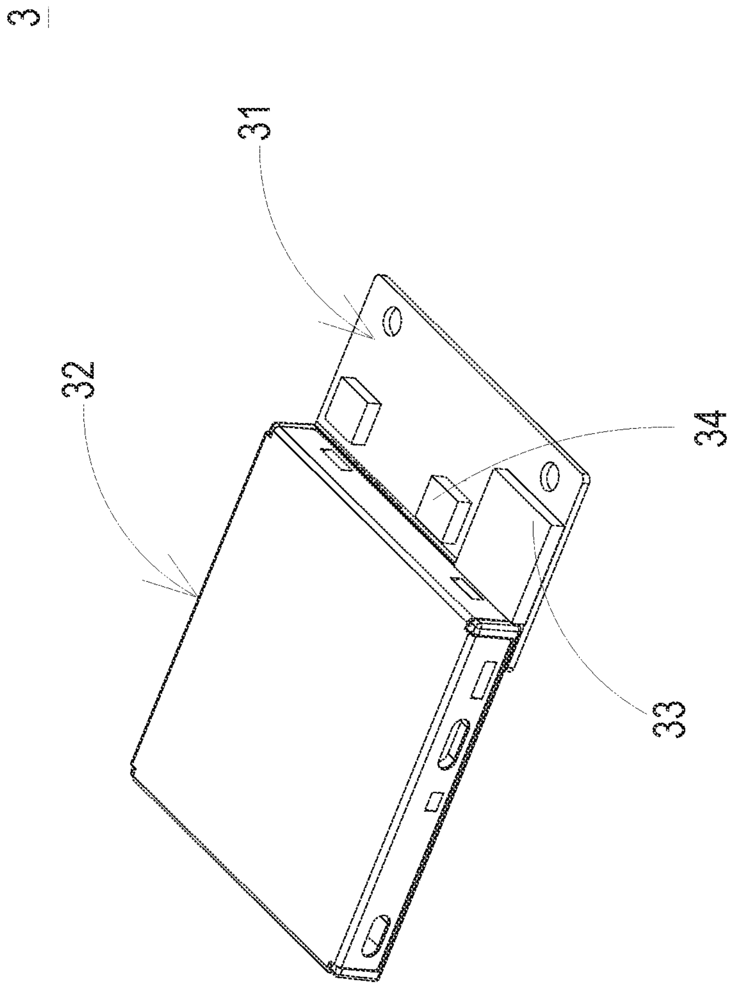
FIG. 3C is a schematic perspective view illustrating the combination relationship of relevant components of the gas detection module without the external power terminal according to the embodiment of the present disclosure.
Figure 4A:
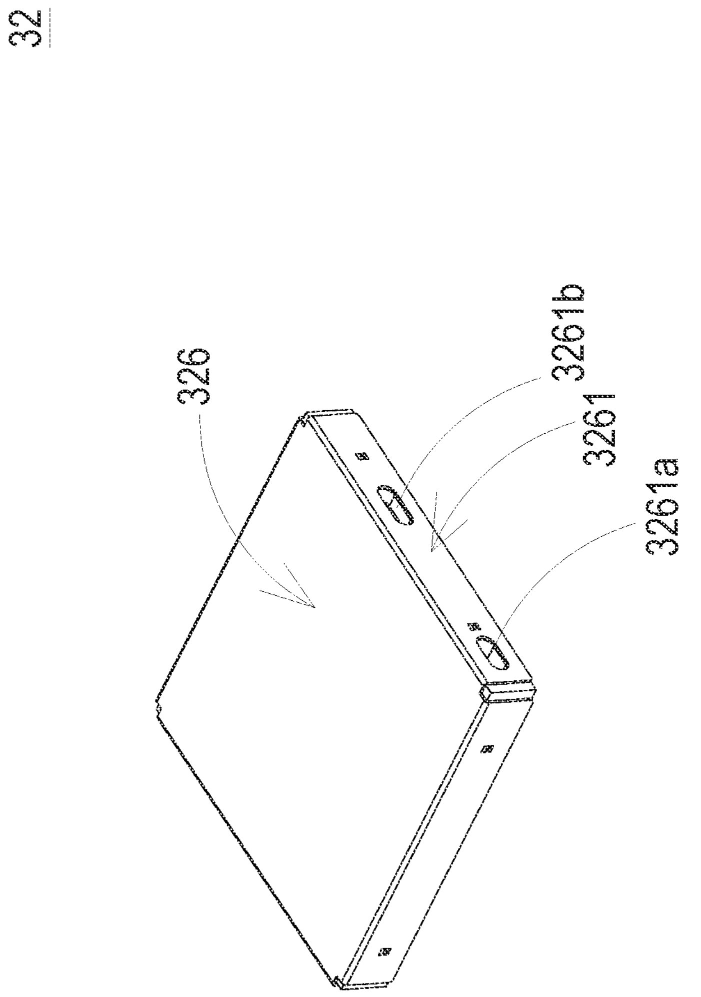
FIG. 4A is a schematic perspective view (1) illustrating the gas detection main part of the gas detection module according to the embodiment of the present disclosure.
Figure 4B:
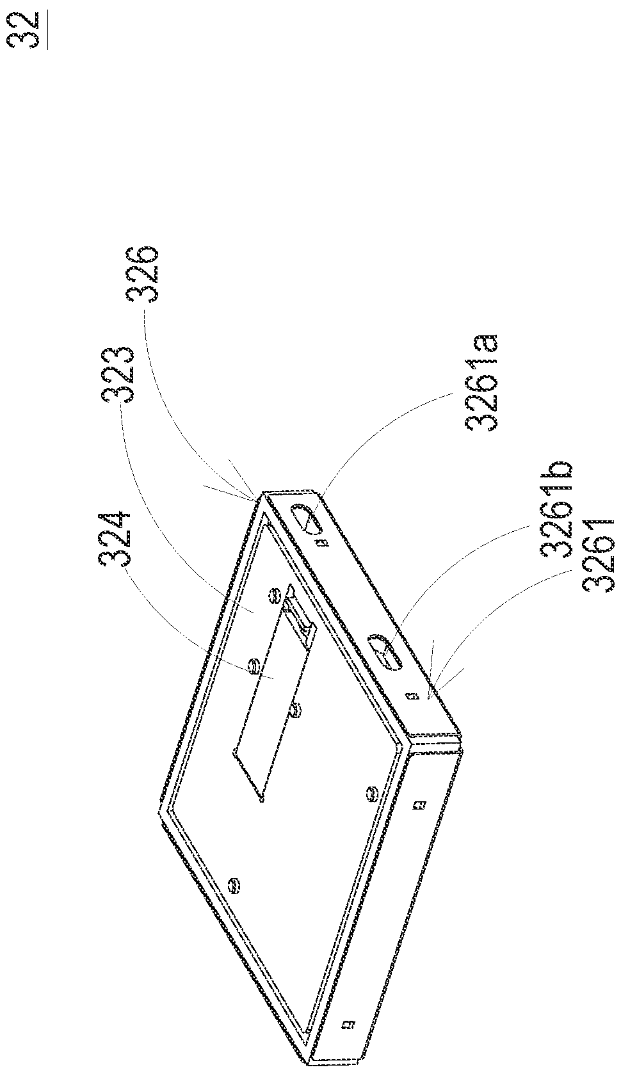
FIG. 4B is a schematic perspective view (2) illustrating the gas detection main part of the gas detection module according to the embodiment of the present disclosure.
Figure 4C:
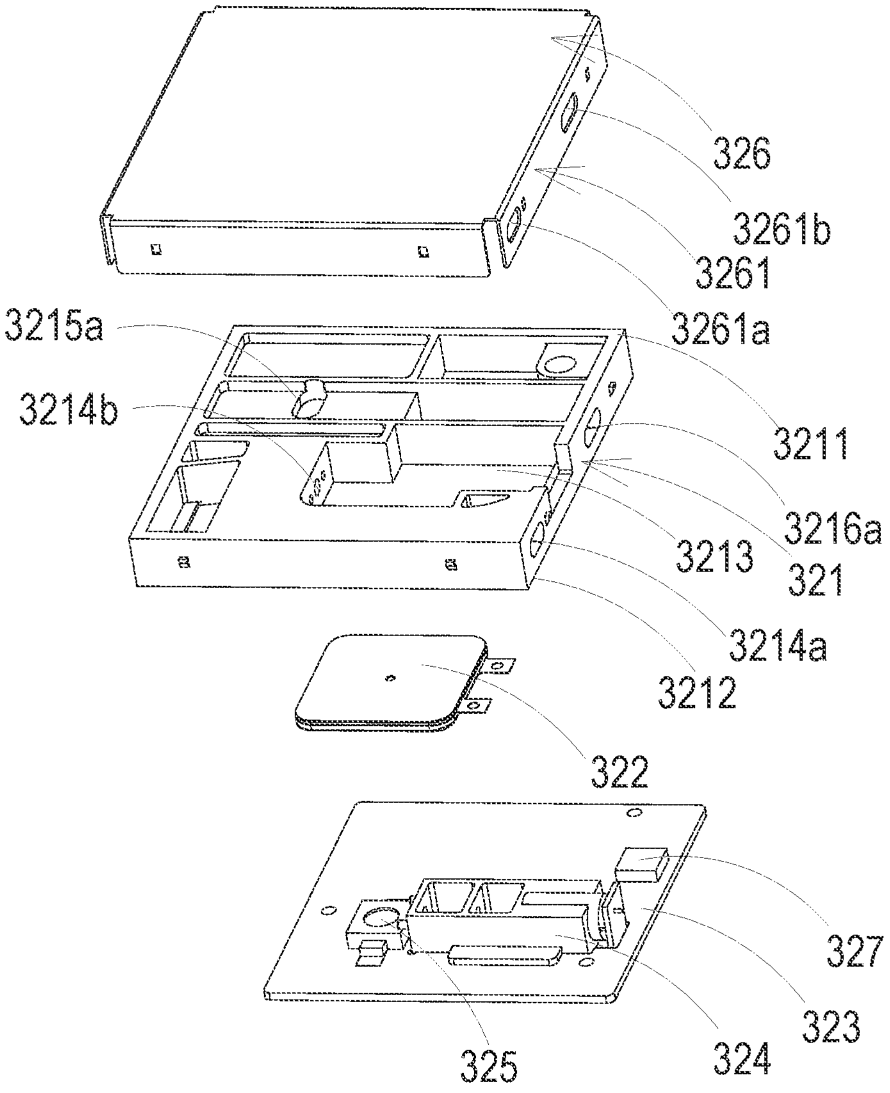
FIG. 4C is an exploded view illustrating the gas detection main part of the gas detection module according to the embodiment of the present disclosure.
Figure 5A:
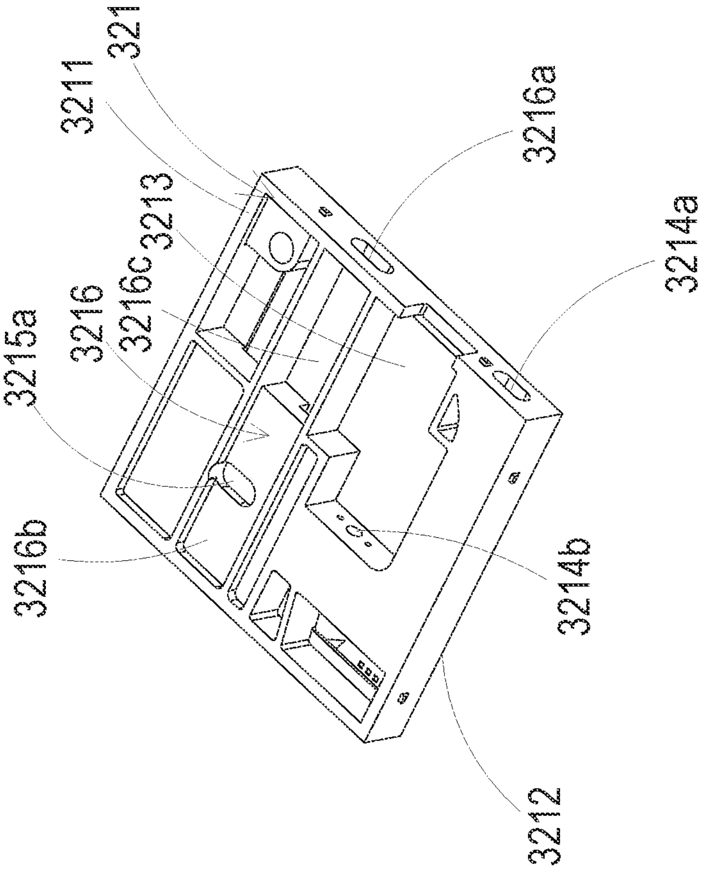
FIG. 5A is a schematic perspective view (1) illustrating the base according to the embodiment of the present disclosure.
Figure 5B:
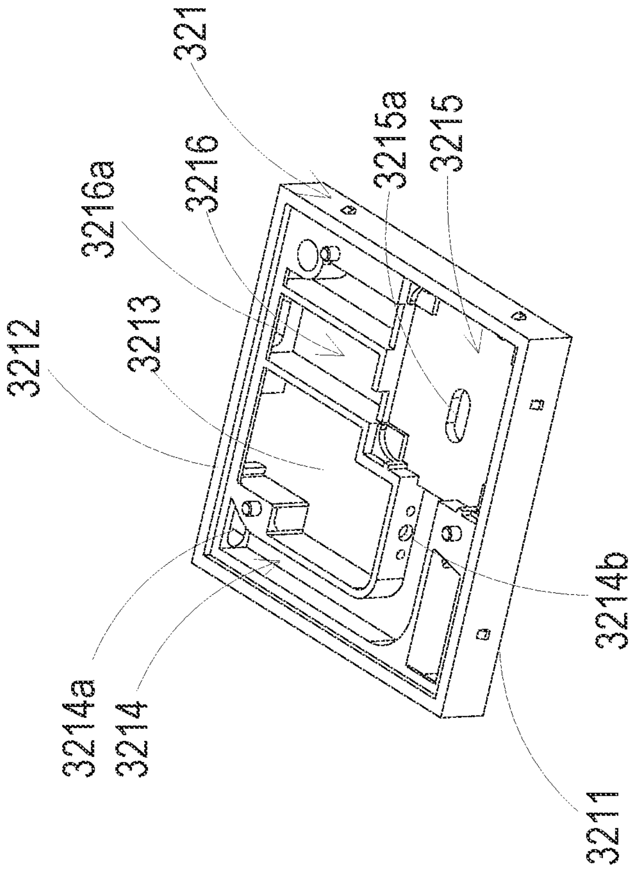
FIG. 5B is a schematic perspective view (2) illustrating the base according to the embodiment of the present disclosure.
Figure 6:
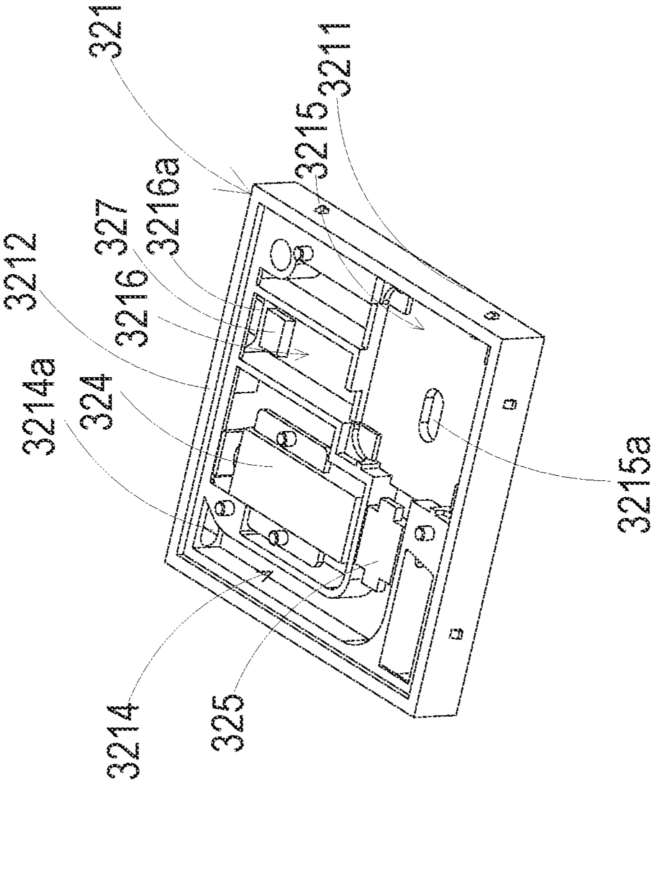
FIG. 6 is a schematic view (3) illustrating the base according to the embodiment of the present disclosure.
Figure 7A:
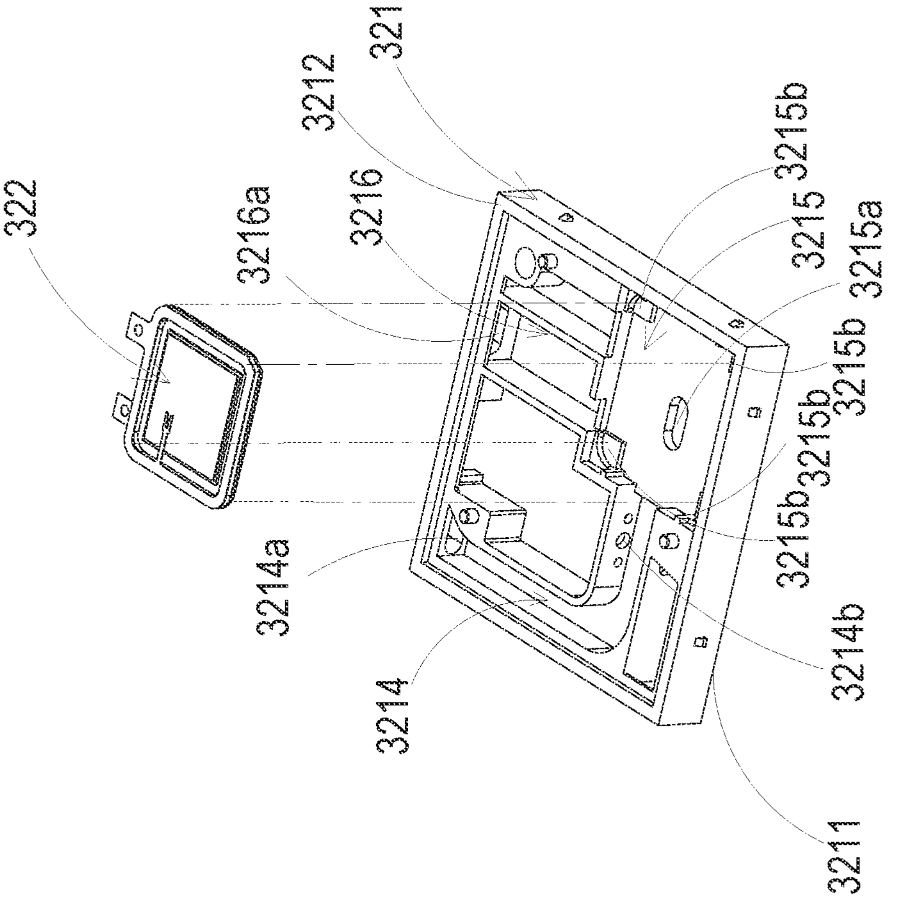
FIG. 7A is a schematic exploded view illustrating the combination of the piezoelectric actuator and the base according to the embodiment of the present disclosure.
Figure 7B:
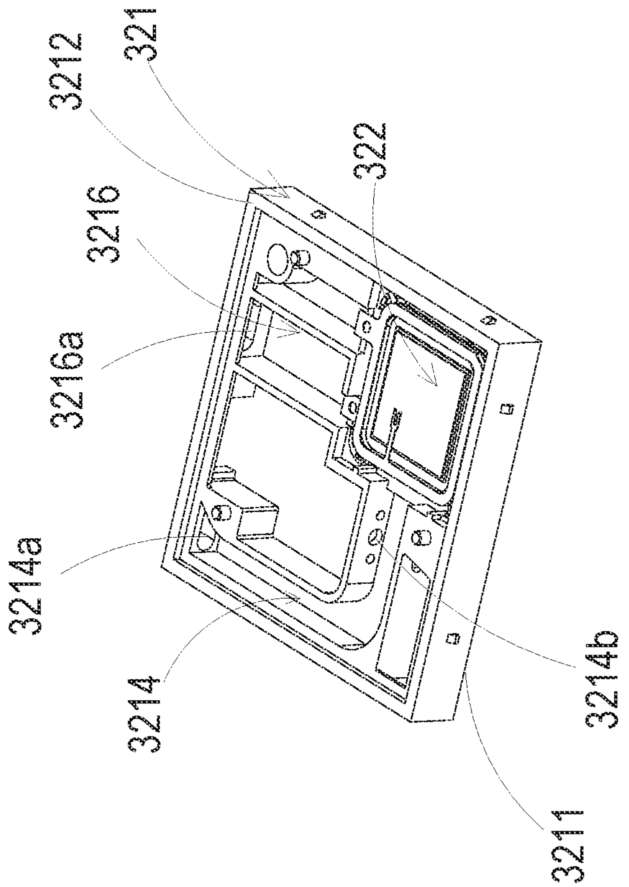
FIG. 7B is a schematic perspective view illustrating the combination of the piezoelectric actuator and the base according to the embodiment of the present disclosure.
Figure 8A:
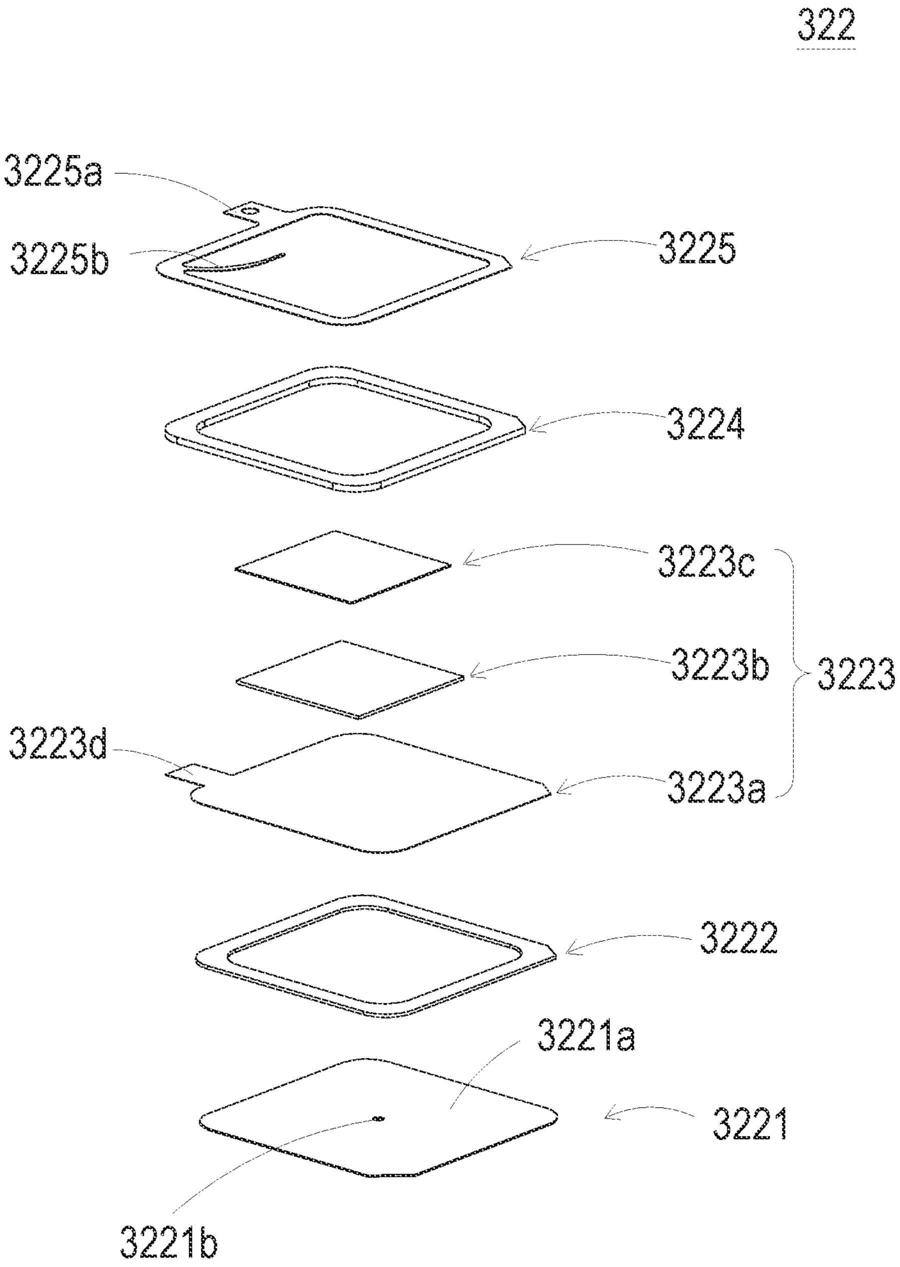
FIG. 8A is a schematic exploded view (1) illustrating the piezoelectric actuator according to the embodiment of the present disclosure.
Figure 8B:
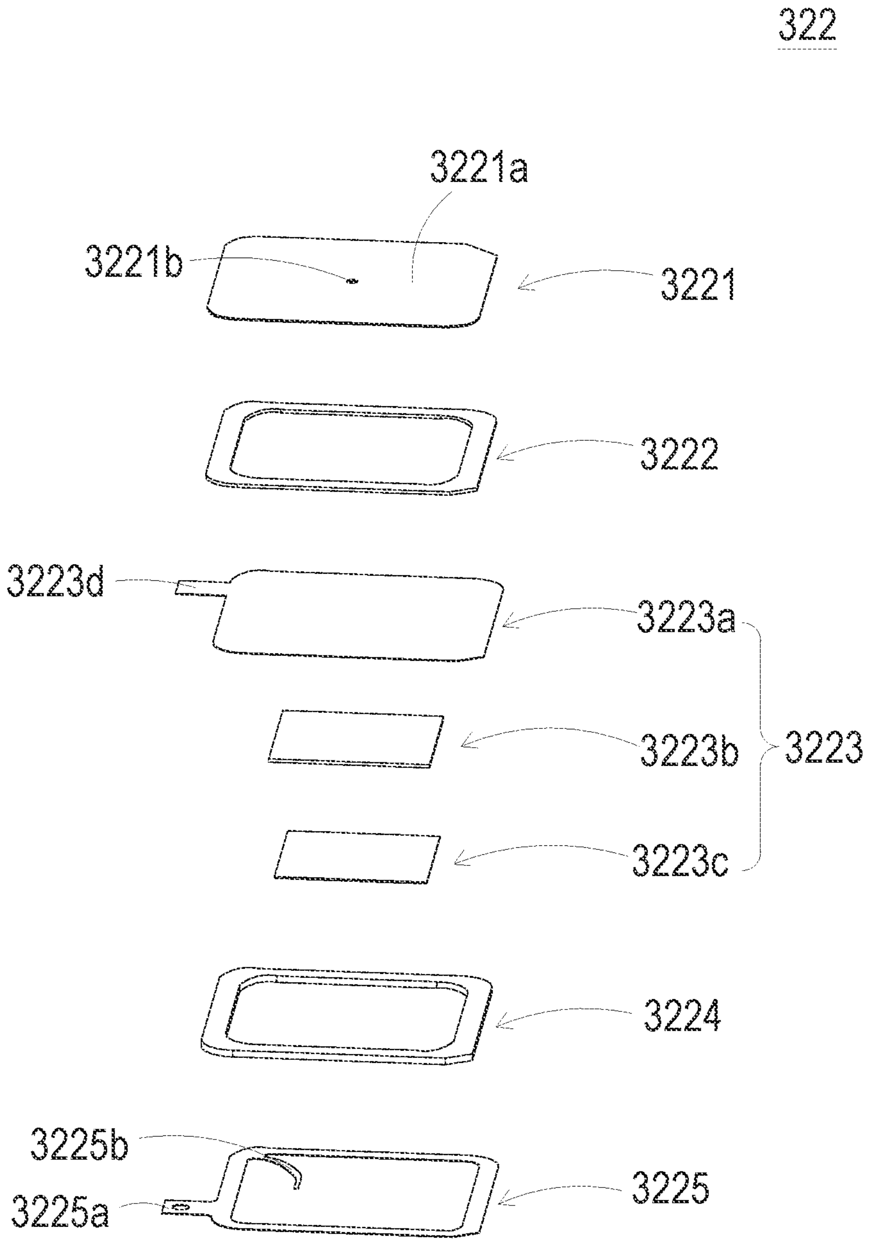
FIG. 8B is a schematic exploded view (2) illustrating the piezoelectric actuator according to the embodiment of the present disclosure.

Please refer to FIG. 2A and FIG. 2B, again. The range hood is applied in the indoor air pollution complete purification and prevention system. Preferably but not exclusively, the networking controller F is an intelligent switch D as shown in FIG. 2A. The intelligent switch D receives the control command through wireless communication to control activation/shutdown mechanism of the air guiding fan 1. Preferably but not exclusively, the networking controller F is a detection microcontroller as shown in FIG. 2B. The detection microcontroller includes a gas detection module A, which receives the control command through wireless communication, detects the air pollution and outputs a gas detection data. The gas detection data are used in a monitoring mechanism status to compare intelligently and issue a driving instruction to control activation/shutdown mechanism of the air guiding fan 1, and control air volume adjustment of the air guiding fan 1. Notably, the above monitoring mechanism status performs a monitoring mechanism in a driving and operation connection of the gas detection module A of the gas detection microcontroller and the air guiding fan 1 of the range hood for determining if the gas detection data of the air pollution detected exceeds a safety detection value. The so-called intelligent comparison is that after the gas detection module A of the detection microcontroller detects the gas detection data, the central control monitor B of the indoor air pollution complete purification and prevention system receives the gas detection data and then links to the cloud device E for performing intelligent calculations to compare the gas detection data detected. Moreover, a control command is intelligently selected and transmitted through the wireless communication transmission to the gas detection module A of the detection microcontroller for receiving. That is to say, a driving instruction is intelligently issued to control the activation of the air guiding fan 1 or the air volume adjustment of the air guiding fan 1. That is, as the gas detection data becomes larger than the safety detection value, the air volume adjustment of the air guiding fan 1 is larger. As the gas detection data is close to the safety detection value, the air volume adjustment of the air guiding fan 1 is small. Moreover, in a preferred embodiment of the present disclosure, the air volume generated by the operation of the range hood must be over the extraction rate of 22 $m^3$/min, and the air pollution is guided to pass through the filtering component 2 for quick filtration and purification within 5 minutes, so that the complete detection and clearance in real time is achieved, the cleanliness reaches the gas state for safe breathing, and the purpose of quickly purifying indoor air quality is achieved. Notably, in some embodiments, the indoor air pollution complete purification and prevention system is used in an indoor environment of a residential home, and cooperated with the air guiding fan 1 of the range hood in the indoor air pollution complete purification and prevention system. Preferably but not exclusively, the air guiding fan 1 is operated with the extraction rate of 22 $m^3$/min, and the air pollution is guided to pass through the filtering component 2 for quick filtration and purification, so that the complete detection and clearance in real time is achieved, and the cleanliness reaches the gas state for safe breathing. In some embodiments, the indoor air pollution complete purification and prevention system is used in an indoor environment of a non-residential home (e.g., the restaurants or the large venues). Preferably but not exclusively, the suitable air guiding fan 1 of the range hood is operated with the extraction rate over 22 $m^3$/min, and the air pollution is guided to pass through the filtering component 2 for quick filtration and purification within 5 minutes, so that the complete detection and clearance in real time is achieved, and the cleanliness reaches the gas state for safe breathing.

Please refer to FIG. 2A, FIG. 2B and FIG. 3 to FIG. 9A. In the above embodiment, the gas detection module A is applied in the indoor air pollution complete purification and prevention system, and includes an outdoor gas detection device A0 and an indoor gas detection device A1. The outdoor gas detection device A0 is used for detecting the characteristics and the concentration of the air pollution and outputting outdoor air pollution data. The indoor gas detection device A1 is used for detecting the characteristics and the concentration of the air pollution and outputting indoor air pollution data. The outdoor gas detection device A0 and the indoor gas detection device A1 have the same structure and function as the above-mentioned gas detection module A. The symbol 3 is used to describe the gas detection module A below. Preferably but not exclusively, as shown in FIG. 3A and FIG. 3B, in an embodiment, the gas detection module 3 includes an external power terminal 35, and the external power terminal is integrally formed with a controlling circuit board 31 into one piece, and protrudes outside the outer shell. Alternatively, in another embodiment, as shown in FIG. 3C, the gas detection module 3 doesn't include any external power terminal. That is to say, the networking controller F is a detection microcontroller including a gas detection module 3 as shown in FIG. 2B. Preferably but not exclusively, the gas detection module 3 can be directly connected to the exterior of the main body 10 of the range hood and linked with the driving operation of the air guiding fan 1 of the range hood. Preferably but not exclusively, the gas detection module 3 is directly embedded in the main body 10 of the range hood and linked with the driving operation of the air guiding fan 1 of the range hood.

Figure 11:
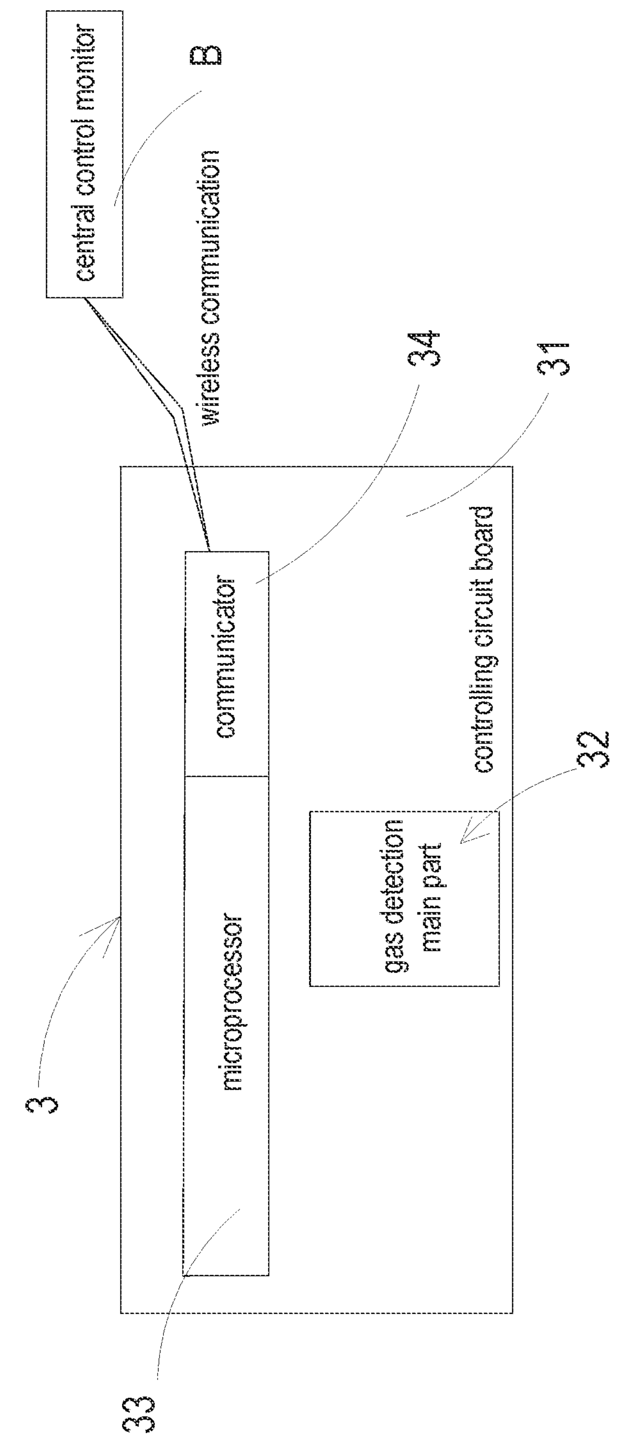
FIG. 11 is a schematic diagram illustrating the communication transmission of the gas detection module according to the embodiment of the present disclosure.

The internal structure and function of the gas detection module 3 will be described below. In the embodiment, the gas detection device 3 includes a controlling circuit board 31, a gas detection main part 32, a microprocessor 33 and a communicator 34. In the embodiment, the gas detection main part 32, the microprocessor 33 and the communicator 34 are integrally packaged on the controlling circuit board 31 and electrically connected to the controlling circuit board 31. The microprocessor 33 and the communicator 34 are disposed on the controlling circuit board 31, and the microprocessor 33 controls the detection of the gas detection main part 32. In that, the gas detection main part 32 detects the air pollution and outputs a detection signal, and the microprocessor receives and processes the detection signal to generate air pollution data and provides the air pollution data to the communicator 34 for a wireless communication transmission externally. In the embodiment, the communicator 34 outputs the air pollution data to the central control monitor B (as shown in FIG. 11) through the wireless communication transmission. The communicator 34 transmits the air pollution data through the wireless communication. Preferably but not exclusively, the wireless communication is one selected from the group consisting of a Wi-Fi communication, a Bluetooth communication, a radio frequency identification communication and a near field communication (NFC).

Please refer to FIG. 4A to FIG. 10C. In the embodiment, the gas detection main part 32 includes a base 321, a piezoelectric actuator 322, a driving circuit board 323, a laser component 324, a particulate sensor 325, and an outer cover 326. In the embodiment, the base 321 includes a first surface 3211, a second surface 3212, a laser loading region 3213, a gas-inlet groove 3214, a gas-guiding-component loading region 3215 and a gas-outlet groove 3216. The first surface 3211 and the second surface 3212 are two surfaces opposite to each other. In the embodiment, the laser loading region 3213 is hollowed out from the first surface 3211 toward the second surface 3212. The outer cover 326 covers the base 321 and includes a side plate 3261. The side plate 3261 has an inlet opening 3261*a* and an outlet opening 3261*b*. The gas-inlet groove 3214 is concavely formed from the second surface 3212 and disposed adjacent to the laser loading region 3213. The gas-inlet groove 3214 includes a gas-inlet 3214*a* and two lateral walls. The gas-inlet 3214*a* is in communication with an environment outside the base 321, and is spatially corresponding in position to an inlet opening 3261*a* of the outer cover 326. Two transparent windows 3214*b* are opened on the two lateral walls of the gas-inlet groove 3214 and are in communication with the laser loading region 3213. Therefore, the first surface 3211 of the base 321 is covered and attached by the outer cover 326, and the second surface 3212 is covered and attached by the driving circuit board 323, so that an inlet path is defined by the gas-inlet groove 3214.

In the embodiment, the gas-guiding-component loading region 3215 mentioned above is concavely formed from the second surface 3212 and in communication with the gas-inlet groove 3214. A ventilation hole 3215*a* penetrates a bottom surface of the gas-guiding-component loading region 3215. The gas-guiding-component loading region 3215 includes four positioning protrusions 3215*b* disposed at four corners of the gas-guiding-component loading region 3215, respectively. In the embodiment, the gas-outlet groove 3216 includes a gas-outlet 3216*a*, and the gas-outlet 3216*a* is spatially corresponding to the outlet opening 3261*b* of the outer cover 326. The gas-outlet groove 3216 includes a first section 3216*b* and a second section 3216*c*. The first section 3216*b* is concavely formed out from the first surface 3211 in a region spatially corresponding to a vertical projection area of the gas-guiding-component loading region 3215. The second section 3216*c* is hollowed out from the first surface 3211 to the second surface 3212 in a region where the first surface 3211 is extended from the vertical projection area of the gas-guiding-component loading region 3215. The first section 3216*b* and the second section 3216*c* are connected to form a stepped structure. Moreover, the first section 3216*b* of the gas-outlet groove 3216 is in communication with the ventilation hole 3215*a* of the gas-guiding-component loading region 3215, and the second section 3216*c* of the gas-outlet groove 3216 is in communication with the gas-outlet 3216*a*. In that, when first surface 3211 of the base 321 is attached and covered by the outer cover 326 and the second surface 3212 of the base 321 is attached and covered by the driving circuit board 323, the gas-outlet groove 3216 and the driving circuit board 323 collaboratively define an outlet path.

In the embodiment, the laser component 324 and the particulate sensor 325 are disposed on and electrically connected to the driving circuit board 323 and located within the base 321. In order to clearly describe and illustrate the positions of the laser component 324 and the particulate sensor 325 in the base 321, the driving circuit board 323 is intentionally omitted. The laser component 324 is accommodated in the laser loading region 3213 of the base 321, and the particulate sensor 325 is accommodated in the gas-inlet groove 3214 of the base 321 and is aligned to the laser component 324. In addition, the laser component 324 is spatially corresponding to the transparent window 3214*b*, therefore, a light beam emitted by the laser component 324 passes through the transparent window 3214*b* and is irradiated into the gas-inlet groove 3214. A light beam path emitted from the laser component 324 passes through the transparent window 3214*b* and extends in an orthogonal direction perpendicular to the gas-inlet groove 3214. In the embodiment, a projecting light beam emitted from the laser component 324 passes through the transparent window 3214*b* and enters the gas-inlet groove 3214 to irradiate the suspended particles contained in the gas passing through the gas-inlet groove 3214. When the suspended particles contained in the gas are irradiated and generate scattered light spots, the scattered light spots are received and calculated by the particulate sensor 325 to obtain the gas detection data. In addition, the gas sensor 327 is positioned and disposed on the driving circuit board 323, electrically connected to the driving circuit board 323, and accommodated in the gas-outlet groove 3216, so as to detect the air pollution introduced into the gas-outlet groove 3216. In other embodiments, the gas sensor 327 is a formaldehyde sensor, a bacteria sensor, a virus sensor or a combination thereof, the formaldehyde sensor is used for detecting gas information of formaldehyde (HCHO), the bacteria sensor is used for detecting gas information of bacteria or fungi, and the virus sensor used for detecting gas information of virus.

In the embodiment, the piezoelectric actuator 322 is accommodated in the square-shaped gas-guiding-component loading region 3215 of the base 321. In addition, the gas-guiding-component loading region 3215 of the base 321 is in fluid communication with the gas-inlet groove 3214. When the piezoelectric actuator 322 is enabled, the gas in the gas-inlet groove 3214 is inhaled by the piezoelectric actuator 322, so that the gas flows into the piezoelectric actuator 322, and is transported into the gas-outlet groove 3216 through the ventilation hole 3215*a* of the gas-guiding-component loading region 3215. Moreover, the driving circuit board 323 covers the second surface 3212 of the base 321, and the laser component 324 is disposed on the driving circuit board 323, and is electrically connected to the driving circuit board 323. The particulate sensor 325 is also disposed on the driving circuit board 323 and electrically connected to the driving circuit board 323. In that, when the outer cover 326 covers the base 321, the inlet opening 3261*a* is spatially corresponding to the gas-inlet 3214*a* of the base 321, and the outlet opening 3261*b* is spatially corresponding to the gas-outlet 3216*a* of the base 321.

In the embodiment, the piezoelectric actuator 322 includes a gas-injection plate 3221, a chamber frame 3222, an actuator element 3223, an insulation frame 3224 and a conductive frame 3225. In the embodiment, the gas-injection plate 3221 is made by a flexible material and includes a suspension plate 3221*a* and a hollow aperture 3221*b*. The suspension plate 3221*a* is a sheet structure and is permitted to undergo a bending deformation. Preferably but not exclusively, the shape and the size of the suspension plate 3221*a* are accommodated in the inner edge of the gas-guiding-component loading region 3215, but not limited thereto. The hollow aperture 3221*b* passes through a center of the suspension plate 3221*a*, so as to allow the gas to flow therethrough. Preferably but not exclusively, in the embodiment, the shape of the suspension plate 3221*a* is selected from the group consisting of a square, a circle, an ellipse, a triangle and a polygon, but not limited thereto.

In the embodiment, the chamber frame 3222 is carried and stacked on the gas-injection plate 3221. In addition, the shape of the chamber frame 3222 is corresponding to the gas-injection plate 3221. The actuator element 3223 is carried and stacked on the chamber frame 3222. A resonance chamber 3226 is collaboratively defined by the actuator element 3223, the chamber frame 3222 and the suspension plate 3221*a* and is formed between the actuator element 3223, the chamber frame 3222 and the suspension plate 3221*a*. The insulation frame 3224 is carried and stacked on the actuator element 3223 and the appearance of the insulation frame 3224 is similar to that of the chamber frame 3222. The conductive frame 3225 is carried and stacked on the insulation frame 3224, and the appearance of the conductive frame 3225 is similar to that of the insulation frame 3224. In addition, the conductive frame 3225 includes a conducting pin 3225a and a conducting electrode 3225b. The conducting pin 3225a is extended outwardly from an outer edge of the conductive frame 3225, and the conducting electrode 3225b is extended inwardly from an inner edge of the conductive frame 3225. Moreover, the actuator element 3223 further includes a piezoelectric carrying plate 3223a, an adjusting resonance plate 3223b and a piezoelectric plate 3223c. The piezoelectric carrying plate 3223a is carried and stacked on the chamber frame 3222. The adjusting resonance plate 3223b is carried and stacked on the piezoelectric carrying plate 3223a. The piezoelectric plate 3223c is carried and stacked on the adjusting resonance plate 3223b. The adjusting resonance plate 3223b and the piezoelectric plate 3223c are accommodated in the insulation frame 3224. The conducting electrode 3225b of the conductive frame 3225 is electrically connected to the piezoelectric plate 3223c. In the embodiment, the piezoelectric carrying plate 3223a and the adjusting resonance plate 3223b are made by a conductive material. The piezoelectric carrying plate 3223a includes a piezoelectric pin 3223d. The piezoelectric pin 3223d and the conducting pin 3225a are electrically connected to a driving circuit (not shown) of the driving circuit board 323, so as to receive a driving signal, such as a driving frequency and a driving voltage. Through this structure, a circuit is formed by the piezoelectric pin 3223d, the piezoelectric carrying plate 3223a, the adjusting resonance plate 3223b, the piezoelectric plate 3223c, the conducting electrode 3225b, the conductive frame 3225 and the conducting pin 3225a for transmitting the driving signal. Moreover, the insulation frame 3224 is insulated between the conductive frame 3225 and the actuator element 3223, so as to avoid the occurrence of a short circuit. Thereby, the driving signal is transmitted to the piezoelectric plate 3223c. After receiving the driving signal such as the driving frequency and the driving voltage, the piezoelectric plate 3223c deforms due to the piezoelectric effect, and the piezoelectric carrying plate 3223a and the adjusting resonance plate 3223b are further driven to generate the bending deformation in the reciprocating manner.

Furthermore, in the embodiment, the adjusting resonance plate 3223b is located between the piezoelectric plate 3223c and the piezoelectric carrying plate 3223a and served as a cushion between the piezoelectric plate 3223c and the piezoelectric carrying plate 3223a. Thereby, the vibration frequency of the piezoelectric carrying plate 3223a is adjustable. Basically, the thickness of the adjusting resonance plate 3223b is greater than the thickness of the piezoelectric carrying plate 3223a, and the vibration frequency of the actuator element 3223 can be adjusted by adjusting the thickness of the adjusting resonance plate 3223b.

Please further refer to FIG. 7A, FIG. 7B, FIG. 8A, FIG. 8B and FIG. 9A. In the embodiment, the gas-injection plate 3221, the chamber frame 3222, the actuator element 3223, the insulation frame 3224 and the conductive frame 3225 are stacked and positioned in the gas-guiding-component loading region 3215 sequentially, so that the piezoelectric actuator 322 is supported and positioned in the gas-guiding-component loading region 3215. A plurality of clearances 3221c are defined between the suspension plate 3221a of the gas-injection plate 3221 and an inner edge of the gas-guiding-component loading region 3215 for gas flowing therethrough. In the embodiment, a flowing chamber 3227 is formed between the gas-injection plate 3221 and the bottom surface of the gas-guiding-component loading region 3215. The flowing chamber 3227 is in communication with the resonance chamber 3226 between the actuator element 3223, the chamber frame 3222 and the suspension plate 3221a through the hollow aperture 3221b of the gas-injection plate 3221. By controlling the vibration frequency of the gas in the resonance chamber 3226 to be close to the vibration frequency of the suspension plate 3221a, the Helmholtz resonance effect is generated between the resonance chamber 3226 and the suspension plate 3221a, so as to improve the efficiency of gas transportation. When the piezoelectric plate 3223c is moved away from the bottom surface of the gas-guiding-component loading region 3215, the suspension plate 3221a of the gas-injection plate 3221 is driven to move away from the bottom surface of the gas-guiding-component loading region 3215 by the piezoelectric plate 3223c. In that, the volume of the flowing chamber 3227 is expanded rapidly, the internal pressure of the flowing chamber 3227 is decreased to form a negative pressure, and the gas outside the piezoelectric actuator 322 is inhaled through the clearances 3221c and enters the resonance chamber 3226 through the hollow aperture 3221b. Consequently, the pressure in the resonance chamber 3226 is increased to generate a pressure gradient. When the suspension plate 3221a of the gas-injection plate 3221 is driven by the piezoelectric plate 3223c to move toward the bottom surface of the gas-guiding-component loading region 3215, the gas in the resonance chamber 3226 is discharged out rapidly through the hollow aperture 3221b, and the gas in the flowing chamber 3227 is compressed, thereby the converged gas is quickly and massively ejected out of the flowing chamber 3227 under the condition close to an ideal gas state of the Benulli's law, and transported to the ventilation hole 3215a of the gas-guiding-component loading region 3215.

Figure 9A:
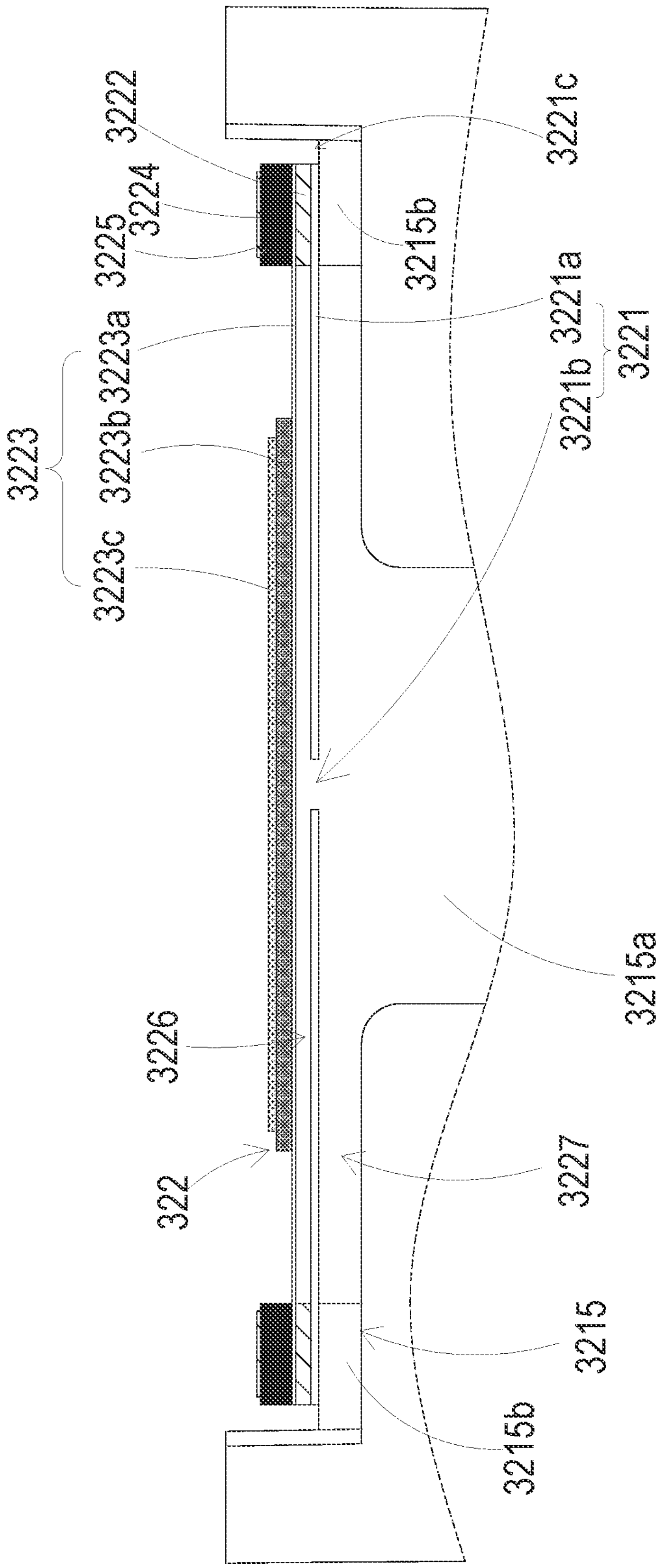
FIG. 9A is a schematic cross-sectional view (1) illustrating an action of the piezoelectric actuator according to the embodiment of the present disclosure.
Figure 9B:
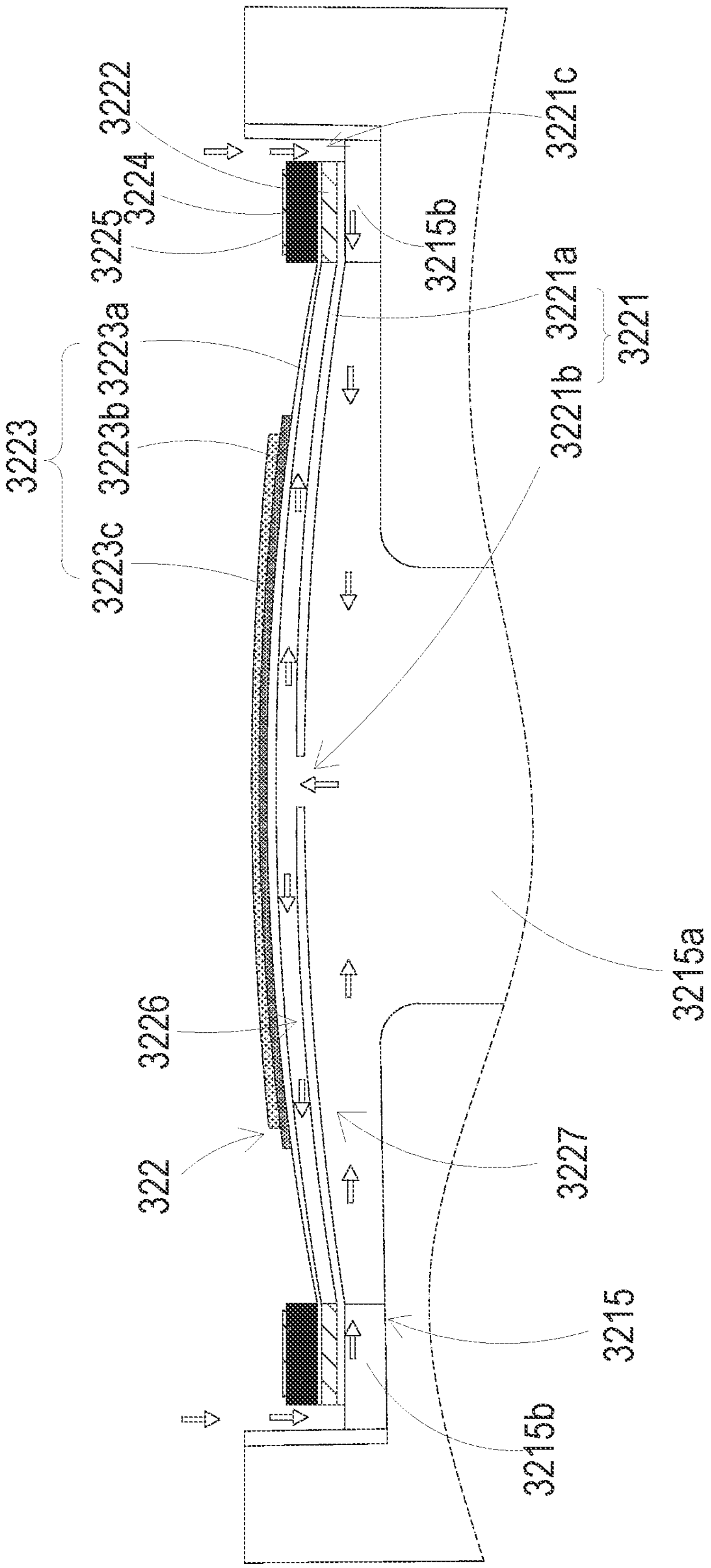
FIG. 9B is a schematic cross-sectional view (2) illustrating an action of the piezoelectric actuator according to the embodiment of the present disclosure.
Figure 9C:
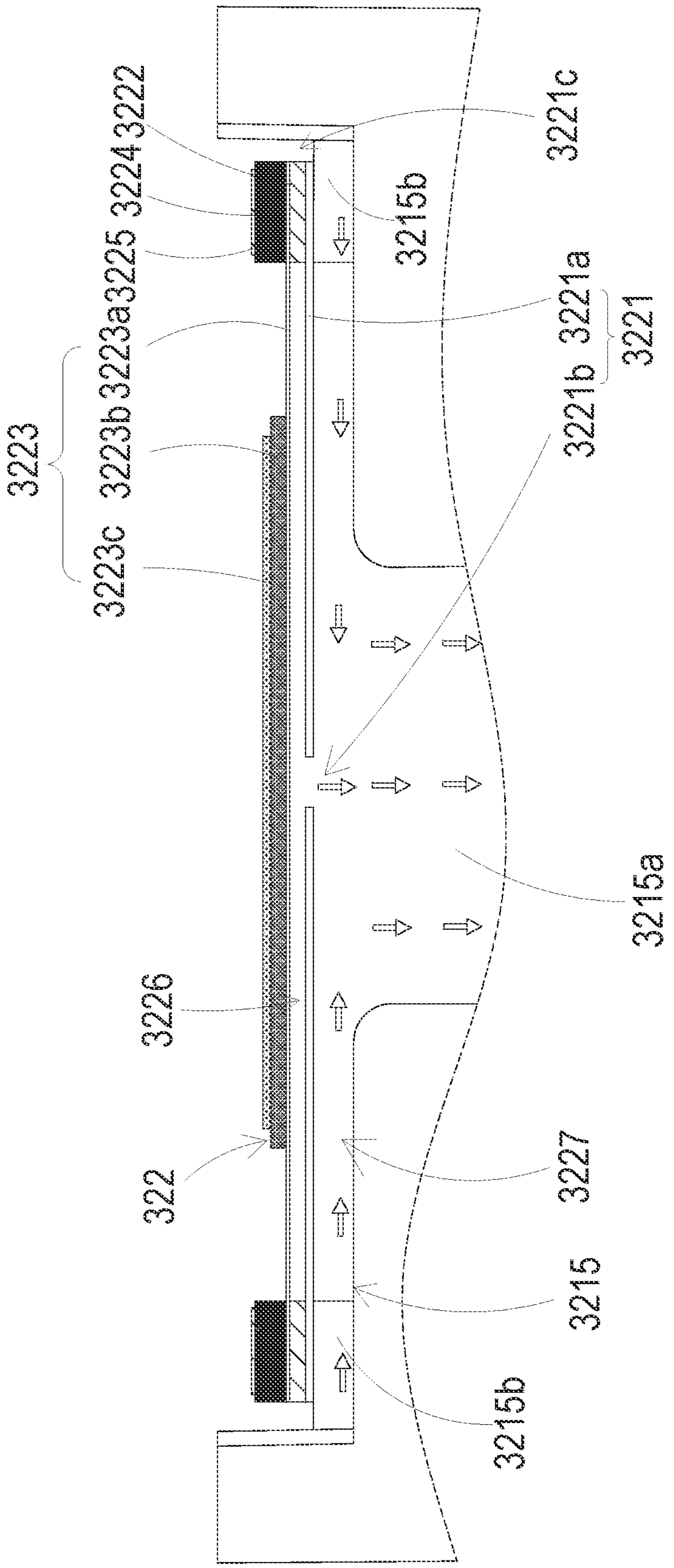
FIG. 9C is a schematic cross-sectional view (3) illustrating an action of the piezoelectric actuator according to the embodiment of the present disclosure.
Figure 10A:
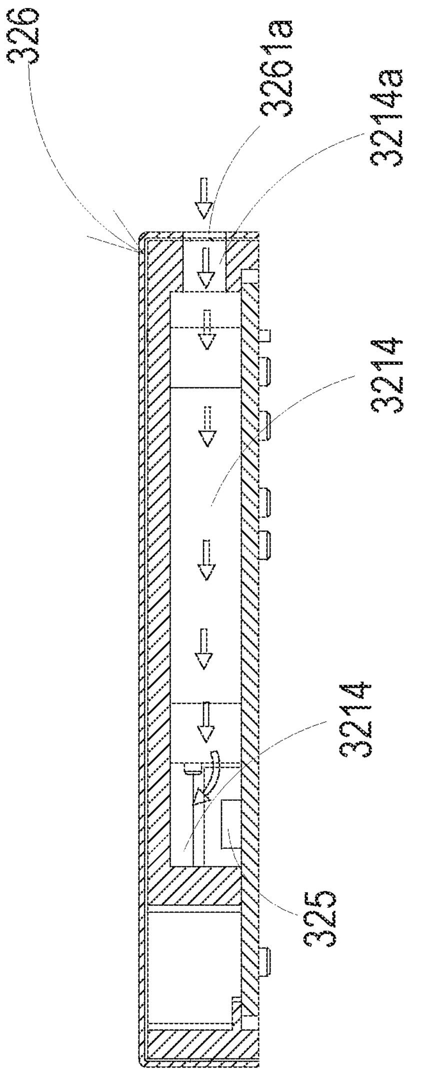
FIG. 10A is a schematic cross-sectional view (1) illustrating the gas detection main part according to the embodiment of the present disclosure.
Figure 10B:
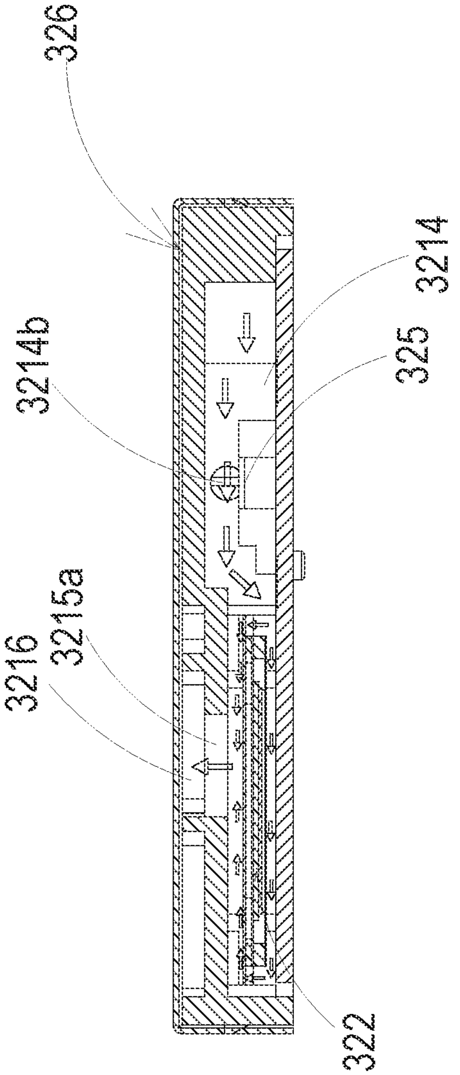
FIG. 10B is a schematic cross-sectional view (2) illustrating the gas detection main part according to the embodiment of the present disclosure.
Figure 10C:
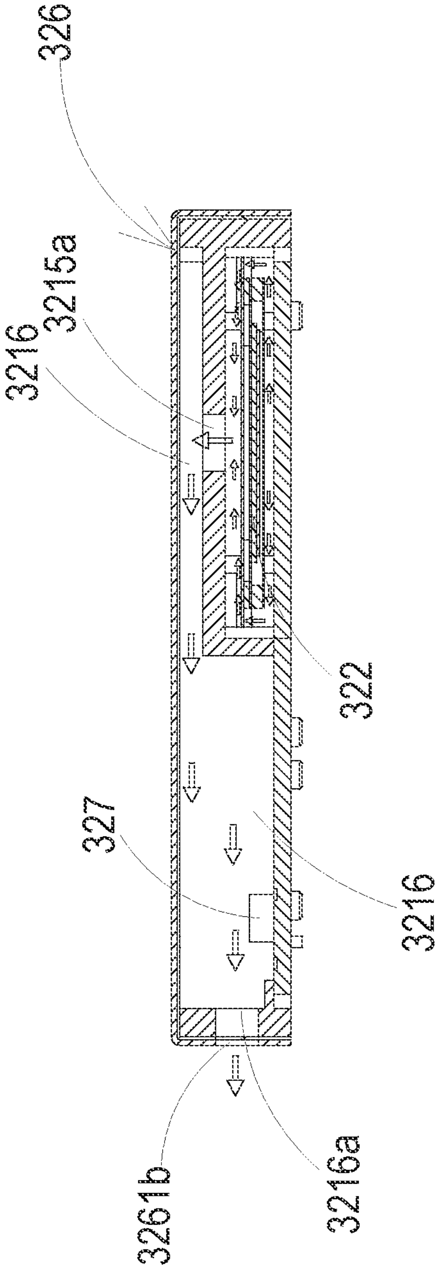
FIG. 10C is a schematic cross-sectional view (3) illustrating the gas detection main part according to the embodiment of the present disclosure.

By repeating the above operation steps shown in FIG. 9B and FIG. 9C, the piezoelectric plate 3223c is driven to generate the bending deformation in a reciprocating manner. According to the principle of inertia, since the gas pressure inside the resonance chamber 3226 is lower than the equilibrium gas pressure after the converged gas is ejected out, the gas is introduced into the resonance chamber 3226 again. Moreover, the vibration frequency of the gas in the resonance chamber 3226 is controlled to be close to the vibration frequency of the piezoelectric plate 3223c, so as to generate the Helmholtz resonance effect to achieve the gas transportation at high speed and in large quantities. The gas is inhaled through the gas-inlet 3214a on the outer cover 326, flows into the gas-inlet groove 3214 of the base 321 through the gas-inlet 3214a, and is transported to the position of the particulate sensor 325. The piezoelectric actuator 322 is enabled continuously to inhale the gas into the inlet path, and facilitate the gas outside the gas detection module to be introduced rapidly, flow stably, and transported above the particulate sensor 325. At this time, a projecting light beam emitted from the laser component 324 passes through the transparent window 3214b to irritate the suspended particles contained in the gas flowing above the particulate sensor 325 in the gas-inlet groove 3214. When the suspended particles contained in the gas are irradiated and generate scattered light spots, the scattered light spots are received and calculated by the particulate sensor 325 for obtaining related information about the sizes and the concentration of the suspended particles contained in the gas. Moreover, the gas above the particulate sensor 325 is continuously driven and transported by the piezoelectric actuator 322, flows into the ventilation hole 3215a of the gas-guiding-component loading region 3215, and is transported to the gas-outlet groove 3216. At last, after the gas flows into the gas outlet groove 3216, the gas is continuously transported into the gas-outlet groove 3216 by the piezoelectric actuator 322, and thus the gas in the gas-outlet groove 3216 is pushed to discharge through the gas-outlet 3216*a* and the outlet opening 3261*b*.

The gas detection module 3 of the present disclosure not only includes particulate sensor 325 for detecting the particulate matters (e.g., PM1 PM2.5 or PM10) in the gas, but also includes gas sensor 327 for detecting the gas characteristics of the introduced gas, for example, to determine whether the gas is formaldehyde, ammonia, carbon monoxide, carbon dioxide, oxygen, ozone, or the like. Therefore, in one or some embodiments, the gas detection module 3 of the present disclosure further includes the gas sensor 327 positioned and disposed on the driving circuit board 323, electrically connected to the driving circuit board 323, and accommodated in the gas-outlet groove 3216, so as to detect the air pollution introduced into the gas-outlet groove 3216. Preferably but not exclusively, in an embodiment, the gas sensor 327 includes a volatile-organic-compound sensor for detecting the information of carbon dioxide ($CO_2$) or volatile organic compounds (TVOC). Preferably but not exclusively, in an embodiment, the gas sensor 327 includes a formaldehyde sensor for detecting the information of formaldehyde (HCHO) gas. Preferably but not exclusively, in an embodiment, the gas sensor 327 includes a bacteria sensor for detecting the information of bacteria or fungi. Preferably but not exclusively, in an embodiment, the gas sensor 327 includes a virus sensor for detecting the information of virus in the gas.

Moreover, in the embodiment of the present disclosure, the filtering component 2 of the range hood is a filter screen to clean the air pollution through a physical way of blocking and absorbing. Preferably but not exclusively, the filtering component 2 is coated with decomposition layer 21 to clean the air pollution through a chemical way. Preferably but not exclusively, the filtering component 2 is combined with a light irradiation element 22 to clean the air pollution through a chemical way. Preferably but not exclusively, the filtering component 2 is combined with a decomposition unit 23 to clean the air pollution through a chemical way. Preferably but not exclusively, in an embodiment, the filter screen is a high efficiency particulate air (HEPA) filter screen 2*a*, which is configured to absorb the chemical smoke, the bacteria, the dust particles and the pollen contained in the air pollution, so that the air pollution introduced is filtered and purified to achieve the effect of filtering and purification. Preferably but not exclusively, the decomposition layer 21 includes an activated carbon 21*a* configured to remove organic and inorganic substances in air pollution, and remove colored and odorous substances. Preferably but not exclusively, the decomposition layer 21 includes a cleansing factor containing chlorine dioxide layer 21*b* configured to inhibit viruses, bacteria, fungi, influenza A, influenza B, enterovirus and norovirus in the air pollution, and the inhibition ratio can reach 99% and more, thereby reducing the cross-infection of viruses. Preferably but not exclusively, the decomposition layer 21 includes an herbal protective layer 21*c* extracted from ginkgo and Japanese *Rhus chinensis* configured to resist allergy effectively and destroy a surface protein of influenza virus (such as H1N1 influenza virus) passing therethrough. Preferably but not exclusively, the decomposition layer 21 includes a silver ion 21*d* configured to inhibit viruses, bacteria and fungi contained in the air pollution. Preferably but not exclusively, the decomposition layer 21 includes a zeolite 21*e* configured to remove ammonia nitrogen, heavy metals, organic pollutants, *Escherichia coli*, phenol, chloroform and anionic surfactants. Furthermore, in some embodiments, the light irradiation element 22 is a photo-catalyst unit including a photo catalyst 22*a* and an ultraviolet lamp 22*b*. When the photo catalyst 22*a* is irradiated by the ultraviolet lamp 22*b*, the light energy is converted into the chemical energy, thereby decomposes harmful gases and disinfects bacteria contained in the air pollution, so as to achieve the effects of filtering and purifying. Preferably but not exclusively, the light irradiation element 22 is a photo-plasma unit including a nanometer irradiation tube 22*c*. When the introduced air pollution is irradiated by the nanometer irradiation tube 22*c*, the oxygen molecules and water molecules contained in the air pollution are decomposed into high oxidizing photo-plasma, and an ion flow capable of destroying organic molecules is generated. In that, volatile formaldehyde, volatile toluene and volatile organic compounds (VOC) contained in the air pollution are decomposed into water and carbon dioxide, so as to achieve the effects of filtering and purifying.

From the above descriptions, the present disclosure provides a range hood applied to a filtration and purification application that is capable of filtering and is connected to the indoor air pollution complete purification and prevention system, whereby detecting and cleaning the air pollution completely. The following is an explanation of the indoor air pollution complete purification and prevention system, which implements air pollution detection and complete purification for filtering and purifying.

Please refer to FIG. 2A and FIG. 2B. In the embodiment, the indoor air pollution complete purification and prevention system is used in an indoor environment and includes a plurality of gas detection modules A, a central control monitor B and a plurality of air exchange filter devices C. The plurality of gas detection modules A are used for detecting the characteristics and the concentration of the air pollution and outputting the indoor air pollution data/the outdoor air pollution data. The central control monitor B receives the outdoor air pollution data and the indoor air pollution data, and performs intelligent calculation and comparison to find out the location and arear of the air pollution in the indoor space. Then, a control command is intelligently selected and issued through the wireless communication transmission. The plurality of air exchange filter devices C receive the control command to operate the activation thereof, and the air pollution is filtered and exchanged through the plurality of air exchange filter devices C until the safety detection value is detected by the plurality of gas detection modules A, the air pollution is removed quickly and cleaned completely, and the cleanliness reaches the gas state for safe breathing.

Preferably but not exclusively, the central control monitor B of the indoor air pollution complete purification and prevention system is one of a central control box or a portable mobile device, which receives the outdoor air pollution gas detection data and indoor air pollution gas detection data through wireless communication to perform intelligent calculation and comparison, and intelligently selects and issues a control command. In the embodiment, the central control monitor B is a portable mobile device that can cooperate with application program (APP) of the indoor air pollution complete purification and prevention system to implement the control commend and display the outdoor air pollution data/indoor air pollution data. Preferably but not exclusively, the wireless communication is one selected from the group consisting of a Wi-Fi communication, a Bluetooth communication, a radio frequency identification communication and a near field communication (NFC). Furthermore, in an embodiment, the central control monitor B is connected to a cloud device E through the Internet. The cloud device E receives the outdoor air pollution gas detection data and indoor air pollution gas detection data collected by the central control monitor B. An intelligent calculation and comparison is performed based on the outdoor air pollution gas detection data and indoor air pollution gas detection data to find out the location and arear of the air pollution in the indoor space. Then, a control command is intelligently selected and issued.

Notably, in the above embodiments, the air exchange filter device C includes at least one air guiding fan 1 and at least one filtering component 2. The air guiding fan 1 has the functions of pumping or supplying air to transport gas in two directions. In the embodiment, the direction of the airflow path is indicated by the arrow for illustration. The air guiding fan 1 is disposed at the front side of the filtering component, or the air guiding fan 1 is disposed at the rear side of the filtering component 2. As shown in FIG. 1A, the air guiding fans 1 are arranged at the front and rear sides of the filtering component 2. Certainly, in other embodiments, the arrangement of the air guiding fan 1 is designed and adjustable according to the practical requirements. In addition, the air exchange filter device C is one selected from the group consisting of a fresh air exchange system C1, an air purifier C2, a heating and cooling air conditioning device C3, an exhaust fan C4, an electric fan C5, a range hood C6 and a combination thereof. The present disclosure is not limited thereto. That is to say, the type or the quantity of the air exchange filter devices C are not limited to a single one. There can be more than one air exchange filter device C, and the demand of air exchange filter devices C can be adjusted according to the square footage of the indoor space and the actual air filtration quality requirements.

The above range hood C6 is the range hood provided by the present disclosure. The networking controller F of the range hood provided by the present disclosure is the intelligent switch D as shown in FIG. 2A. The intelligent switch D refers to a unit that uses the combination and programming of a control panel and electronic components to realize intelligent switching control of the circuit. That is, the equipment is controlled and switched through the wireless communication links. The intelligent switch D receives the control command to control activation/shutdown mechanism of the air guiding fan 1. Moreover, the intelligent switch D receives the control command through wireless communication. Namely, the intelligent switch D receives the control command transmitted by the central control monitor B through wireless communication. It allows to detect and determine if the connection signal of the wireless communication of the intelligent switch D is normal by the central control monitor B, so as to display or notify a warning. When the connection signal of the wireless communication with the air exchange filter device C is abnormal, the user will be notified at this time that the air exchange filter device C must be manually activated. Thereby, a debugging mechanism is achieved to prevent communication connection from errors in advance. The indoor air pollution complete purification and prevention system allows quickly filtering and exchanging the air pollution through the filtering component 2 until the safety detection value is detected by the plurality of the gas detection modules A, so that the air pollution is cleaned completely and the cleanliness reaches the gas state for safe breathing. Moreover, the networking controller F of the range hood provided by the present disclosure is a detection microcontroller as shown in FIG. 2B and includes a gas detection module A, which receives the control command through wireless communication, detects the air pollution and outputs gas detection data. The gas detection data are used in the monitoring mechanism status to compare intelligently and issue a driving instruction to control the activation/shutdown mechanism of the air guiding fan 1, and control the air volume adjustment of the air guiding fan 1. Furthermore, the air exchange filter devices C (e.g., the range hood C6 of the present disclosure) includes the gas detection module A (e.g., the detection microcontroller of the range hood C6 of the present disclosure including the gas detection module A) disposed therein. It allows to control the activation mechanism of the air guiding fan 1 when the detected air pollution data exceeds the safety detection value, and control the air volume adjustment of the air guiding fan 1 at suitable values based on the detected air pollution data. The air exchange filter device C is formed to be more intelligent to regulate the control activation mechanism. That is to say, the gas detection module A installed in the air exchange filter device C can actively control the activation mechanism of the air guiding fan 1 of the air exchange filter device C when the nearby air pollution is detected to exceeds the set safety detection value, and control the appropriate air volume adjustment of the air guiding fan 1 according to the detected air pollution data, so as to form the air convection to remove the air pollution. Thereby, the air pollution can be filtered and removed quickly through the nearby filtering component 2, and the intelligent, timely control and energy-saving air exchanger filter device C is achieved to control the filtration and removal mechanism.

In addition, the cloud device E of the indoor air pollution complete purification and prevention system compares the indoor air pollution data under the intelligent calculation, and the intelligent calculation is implemented through the artificial intelligence (AI) and big data comparison, so as to find the location of the air pollution with the highest air pollution data in the indoor space. In an embodiment, the indoor air pollution data detected by at least three indoor gas detection module A are compared, at least three detection points are utilized under the intelligent calculation to determine the location and area of the air pollution in the indoor space. At this time, after the cloud device E determines the location and area of the air pollution in the indoor space, the control command is intelligently selected and issued to the central control monitor B for receiving, and then the central control monitor B transmits the control command to the plurality of air exchange filter devices C for receiving to regulate the control activation mechanism. The control activation mechanism is regulated to form operations of the plurality of air exchanger filter devices C. The air exchange filter device C closet to the location and area of the air pollution receives the control command to preferentially start the operation, so as to form air pollution purification path first. That is to say, the air guiding fan 1 of the air exchange filter device C closet to the location and area of the air pollution forms the activation operation mechanism first. Then, the control command is transmitted to the rest of air exchange filter devices C outside the location and area of air pollution, so as to form the second wave of activation operation. That is, the rest of the air guiding fans 1 of the other air exchange filter devices C outside the location and area of the air pollution are enabled in the second wave of activation operation mechanism, which promotes the generation of gas convection directed to the air pollution and accelerates the air pollution convection cycle in the area where the air pollution is located. Whereby, the air convection is directed towards the air pollution, and the convection circulation in the location and area of the air pollution is accelerated. Consequently, the air exchange filter device C in the location and area of the air pollution location can not only filter and remove the air pollution immediately, but also diffuse and move the air pollution outside the location and area of the air pollution. Furthermore, the rest of air exchange filter devices are used to accelerate the filtration and removal for the location and area of the air pollution. Till the safety detection value is detected by the plurality of gas detection modules A, the air pollution is removed quickly and cleaned completely, and the cleanliness reaches the gas state for safe breathing.

In summary, the present disclosure provides a range hood applied to a filtration and purification application that is capable of filtering and is connected to an indoor air pollution complete purification and prevention system, whereby detecting and cleaning the air pollution completely. With a networking controller connected to an indoor air pollution complete purification and prevention system, it allows to control an activation operation of an air guiding fan, and guide air pollution to pass through filtering component for filtering the air pollution. At the same time, it further allows to detect the indoor air pollution quality and intelligently compare the ambient air quality status, and the air guiding fan is controlled according to the air pollution quality in real time to adjust the extraction rate for filtering the air pollution. Thereby, the air pollution is detected instantly and purified instantly to clean completely in a filtration and purification treatment for the ambient air quality. The present disclosure includes the industrial applicability and the inventive steps.

What is claimed is:

1. A range hood for an indoor air pollution purification system, wherein the indoor air pollution purification system comprises a central control monitor and a plurality of gas detection modules, and the central control monitor performs calculation and comparison between outdoor air pollution data and indoor air pollution data for issuing a control command, the range hood comprising:

a main body configured to form an airflow path;

an air guiding fan disposed in the airflow path, and operated to guide an air convection with an extraction rate over 22 $m^3$/min;

a filtering component disposed in the airflow path and configured to filter an air pollution in the air convection guided by the air guiding fan; and a networking controller disposed on the main body for receiving the control command from the central control monitor through wireless communication and performing an activation operation of the air guiding fan based on the control command, wherein the central control monitor detects and determines if a connection signal of the wireless communication with the networking controller is normal, and sends out a warning when the wireless communication is abnormal.

2. The range hood according to claim 1, wherein the air pollution is at least one selected from the group consisting of particulate matter, carbon monoxide, carbon dioxide, ozone, sulfur dioxide, nitrogen dioxide, lead, total volatile organic compounds (TVOC), formaldehyde, bacteria, fungi, virus and a combination thereof.

3. The range hood according to claim 1, wherein the indoor air pollution purification system is used in an indoor environment of a residential home, and is suitable for the air guiding fan operated with the extraction rate of a clean air delivery rate (CADR) of 22 $m^3$/min in the range hood, whereby the system filters and purifies the air pollution through the filtering component, so as to reach a preset indoor space cleanliness.

4. The range hood according to claim 1, wherein the indoor air pollution purification system is used in a non-residential indoor environment, and is suitable for the air guiding fan operated with the extraction rate of a clean air delivery rate (CADR) over 22 $m^3$/min in the range hood, whereby the system filters and purifies the air pollution through the filtering component, so as to reach a preset indoor space cleanliness.

5. The range hood according to claim 1, wherein the networking controller is a switch receiving the control command through wireless communication to control an activation/shutdown mechanism of the air guiding fan.

6. The range hood according to claim 1, wherein the networking controller is a detection microcontroller including a gas detection module for receiving the control command through wireless communication, and the gas detection module further detects the air pollution and outputs gas detection data, wherein the gas detection module provides a monitoring mechanism status, wherein the gas detection data of the gas detection module are compared and a driving instruction is issued to control an activation/shutdown mechanism of the air guiding fan, and an air volume of the air guiding fan is adjusted.

7. The range hood according to claim 6, wherein the monitoring mechanism status comprises monitoring the gas detection data for determining if the gas detection data of the air pollution exceeds a safety detection value.

8. The range hood according to claim 7, wherein the safety detection value includes at least one selected from the group consisting of a concentration of PM2.5 which is less than 15 μg/$m^3$, a concentration of carbon dioxide which is less than 1000 ppm, a concentration of total volatile organic compounds (TVOC) which is less than 0.56 ppm, a concentration of formaldehyde (HCHO) which is less than 0.08 ppm, a colony-forming unit of bacteria which is less than 1500 CFU/$m^3$, a colony-forming unit of fungi which is less than 1000 CFU/$m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, and a concentration of lead which is less than 0.15 μg/$m^3$.

9. The range hood according to claim 6, wherein the gas detection module comprises a controlling circuit board, a gas detection main part, a microprocessor and a communicator, and the gas detection main part, the microprocessor and the communicator are integrally packaged on the controlling circuit board and electrically connected to the controlling circuit board, wherein the microprocessor controls the detection of the gas detection main part, the gas detection main part detects the air pollution and outputs a detection signal, and the microprocessor receives and processes the detection signal to generate the gas detection data and provides the gas detection data to the communicator for an external communication transmission to the indoor air pollution purification system.

10. The range hood according to claim 9, wherein the detection microcontroller receives the control command through wireless communication, wherein the control command is received by the communicator and issued by the indoor air pollution purification system.

11. The range hood according to claim 9, wherein the gas detection main part comprises:

a base comprising:

a first surface;

a second surface opposite to the first surface;

a laser loading region hollowed out from the first surface to the second surface;

a gas-inlet groove concavely formed from the second surface and disposed adjacent to the laser loading region, wherein the gas-inlet groove comprises a gas-inlet and two lateral walls, the gas-inlet is in communication with an environment outside the base, and a transparent window is opened on the two lateral walls and is in communication with the laser loading region;

a gas-guiding-component loading region concavely formed from the second surface and in communication with the gas-inlet groove, wherein a ventilation hole penetrates a bottom surface of the gas-guiding-component loading region; and a gas-outlet groove concavely formed from the first surface, spatially corresponding to the bottom surface of the gas-guiding-component loading region, and hollowed out from the first surface to the second surface in a region where the first surface is not aligned with the gas-guiding-component loading region, wherein the gas-outlet groove is in communication with the ventilation hole, and a gas-outlet is disposed in the gas-outlet groove;

a piezoelectric actuator accommodated in the gas-guiding-component loading region;

a driving circuit board covering and attached to the second surface of the base;

a laser component positioned and disposed on the driving circuit board, electrically connected to the driving circuit board, and accommodated in the laser loading region, wherein a light beam path emitted from the laser component passes through the transparent window and extends in a direction perpendicular to the gas-inlet groove, thereby forming an orthogonal direction with the gas-inlet groove;

a particulate sensor positioned and disposed on the driving circuit board, electrically connected to the driving circuit board, and disposed at an orthogonal position where the gas-inlet groove intersects the light beam path of the laser component in the orthogonal direction, so that suspended particles contained in the air pollution passing through the gas-inlet groove and irradiated by a projecting light beam emitted from the laser component are detected;

a gas sensor positioned and disposed on the driving circuit board, electrically connected to the driving circuit board, and accommodated in the gas-outlet groove, so as to detect the air pollution introduced into the gas-outlet groove; and an outer cover covering the base and comprising a side plate, wherein the side plate has an inlet opening and an outlet opening, the inlet opening is spatially corresponding to the gas-inlet of the base, and the outlet opening is spatially corresponding to the gas-outlet of the base;

wherein the outer cover covers the base, and the driving circuit board covers the second surface, thereby an inlet path is defined by the gas-inlet groove, and an outlet path is defined by the gas-outlet groove, so that the air pollution is inhaled from the environment outside the base by the piezoelectric actuator, transported into the inlet path defined by the gas-inlet groove through the inlet opening, and passes through the particulate sensor to detect the particle concentration of the suspended particles contained in the air pollution, and the air pollution transported through the piezoelectric actuator is transported out of the outlet path defined by the gas-outlet groove through the ventilation hole, passes through the gas sensor for detecting, and then discharged through the outlet opening.

12. The range hood according to claim 11, wherein the particulate sensor is used for detecting suspended particulate information.

13. The range hood according to claim 11, wherein the gas sensor comprises a volatile-organic-compound sensor for detecting gas information of carbon dioxide ($CO_2$) or volatile organic compounds (TVOC).

14. The range hood according to claim 11, wherein the gas sensor comprises a formaldehyde sensor, a bacteria sensor, a virus sensor or a combination thereof, detecting gas information of formaldehyde (HCHO), bacteria or fungi, and virus, respectively.

15. The range hood according to claim 1, wherein the wireless communication is one selected from the group consisting of a Wi-Fi communication, a Bluetooth communication, a radio frequency identification communication and a near field communication (NFC).

16. The range hood according to claim 1, wherein the filtering component is a filter screen to clean the air pollution through a physical way of blocking and absorbing.

17. The range hood according to claim 1, wherein the filtering component is coated with a decomposition layer to clean the air pollution through a chemical way.

18. The range hood according to claim 1, wherein the filtering component is combined with a light irradiation element to clean the air pollution through a chemical way.

19. The range hood according to claim 1, wherein the main body comprises a lateral air exhaust opening in communication with the airflow path, and a baffle disposed above the lateral air exhaust opening, wherein the baffle is configured to fold to cover the lateral air exhaust opening to block the air pollution, or extend to uncover the lateral air exhaust opening for air pollution treatment.

* * * * *